US012615125B2

(12) United States Patent
Takeda et al.

(10) Patent No.: US 12,615,125 B2
(45) Date of Patent: Apr. 28, 2026

(54) TERMINAL, COMMUNICATION METHOD, BASE STATION, AND SYSTEM

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/535,574

(22) Filed: Dec. 11, 2023

(65) Prior Publication Data

US 2024/0137186 A1     Apr. 25, 2024

Related U.S. Application Data

(63) Continuation of application No. 17/270,295, filed as application No. PCT/JP2018/031606 on Aug. 27, 2018, now abandoned.

(51) Int. Cl.
H04L 5/00          (2006.01)
H04W 72/21        (2023.01)

(52) U.S. Cl.
CPC ........... H04L 5/0057 (2013.01); H04W 72/21 (2023.01)

(58) Field of Classification Search
CPC .............................. H04L 5/0057; H04W 72/21
USPC .......................................................... 370/329
See application file for complete search history.

(56) References Cited

U.S. PATENT DOCUMENTS

| | | | |
|---|---|---|---|
| 2012/0314671 A1 | 12/2012 | Noh et al. | |
| 2013/0176953 A1* | 7/2013 | Stern-Berkowitz | .......................... H04W 52/365 370/329 |
| 2019/0373592 A1* | 12/2019 | Ji | ........................... H04B 7/063 |
| 2020/0213070 A1* | 7/2020 | Guo | ......................... H04L 5/10 |

FOREIGN PATENT DOCUMENTS

| | | |
|---|---|---|
| EP | 2 887 725 A1 | 6/2015 |
| JP | 2014-007669 A | 1/2014 |

OTHER PUBLICATIONS

International Search Report for corresponding International Application No. PCT/JP2018/031606, mailed Nov. 13, 2018 (5 pages).

(Continued)

*Primary Examiner* — Chi Tang P Cheng

(74) *Attorney, Agent, or Firm* — Osha Bergman Watanabe & Burton LLP

(57)          ABSTRACT

A terminal is disclosed including a receiver that receives information including multiple spatial relation information; and a processor that controls transmission of channel state information using first spatial relation information that corresponds to a first transmission and reception point among the multiple spatial relation information, on a first repetition of multiple repetitions of an uplink shared channel, and controls transmission of the channel state information using second spatial relation information that corresponds to a second transmission and reception point among the multiple spatial relation information, on a second repetition of the multiple repetitions of the uplink shared channel. In other aspects, a communication method, a base station, and a system are also disclosed.

6 Claims, 17 Drawing Sheets

(56) References Cited

OTHER PUBLICATIONS

Written Opinion for corresponding International Application No. PCT/JP2018/031606, mailed Nov. 13, 2018 (4 pages).

3GPP TS 36.300 V8.12.0; "3rd Generation Partnership Project; Technical Specification Group Radio Access Network; Evolved Universal Terrestrial Radio Access (E-UTRA) and Evolved Universal Terestrial Radio Access Network (E-UTRAN); Overall description; Stage 2 (Release 8)"; Mar. 2010 (149 pages).

NTT Docomo, Inc., "Enhanced UL transmission with configured grant for URLLC", 3GPP TSG RAN WG1 Meeting #94, R1-1809165, Gothenburg, Sweden, Aug. 20-24, 2018 (5 pages).

* cited by examiner

EACH REPETITION IS TRANSMITTED TO EACH TRP

CHANNEL/SIGNAL
(E.G., PUSCH)

| | | | |
|---|---|---|---|
| ▨ UL TRANSMISSION | | ▧ UL TRANSMISSION | |
| ▦ UL TRANSMISSION | | ▥ UL TRANSMISSION | |

TRP #1 = TCI STATE #0

TRP #2 = TCI STATE #1

TRP #3 = TCI STATE #2

TRP #4 = TCI STATE #3

UE

PUSCH IS TRANSMITTED TO
DIFFERENT TRP PER RV

PUSCH IS TRANSMITTED TO DIFFERENT TRP PER RV

PUSCH (TRP #1 = TCI STATE #0)

PUSCH (TRP #2 = TCI STATE #1)

PUSCH (TRP #3 = TCI STATE #2)

PUSCH (TRP #4 = TCI STATE #3)

FIG. 4A

| GIVEN FIELD VALUE IN DCI | TCI STATE BETWEEN REPETITIONS |
|---|---|
| 000 | TCI STATE ID #0 FOR k = 0, TCI STATE ID #1 FOR k = 1, TCI STATE ID #2 FOR k = 2, ... |
| 001 | TCI STATE ID #3 FOR k = 0, TCI STATE ID #1 FOR k = 1, TCI STATE ID #2 FOR k = 2, ... |
| 010 | TCI STATE ID #0 FOR k = 0, TCI STATE ID #0 FOR k = 1, TCI STATE ID #0 FOR k = 2, ... |
| ... | ... |

FIG. 4B

| GIVEN FIELD VALUE IN DCI | TCI STATE BETWEEN REPETITIONS |
|---|---|
| 000 | TCI STATE ID #0 FOR p = 0, TCI STATE ID #1 FOR p = 2, TCI STATE ID #2 FOR p = 3, ... |
| 001 | TCI STATE ID #3 FOR p = 0, TCI STATE ID #1 FOR p = 2, TCI STATE ID #2 FOR p = 3, ... |
| 010 | TCI STATE ID #0 FOR p = 0, TCI STATE ID #0 FOR p = 2, TCI STATE ID #0 FOR p = 3, ... |
| ... | ... |

| GIVEN FIELD VALUE IN DCI | TCI STATE BETWEEN REPETITIONS |
|---|---|
| 000 | TCI STATE ID #0 |
| 001 | TCI STATE ID #3 |
| ... | ... |

FIG. 5

FIG. 6A
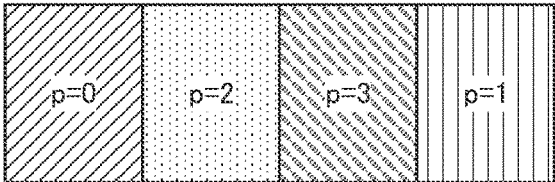
FIG. 6B
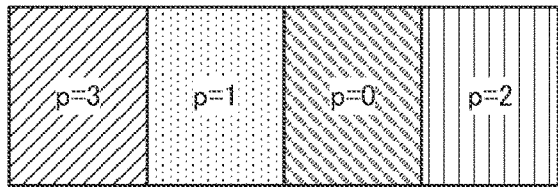
FIG. 6C
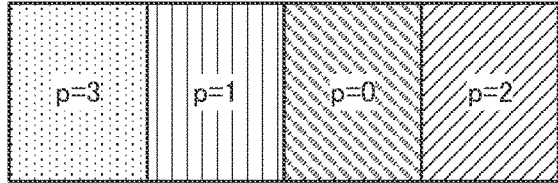
FIG. 6D
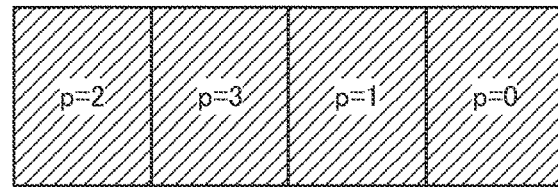
⬚ PUSCH (TRP #1 = TCI STATE #0)     ⬚ PUSCH (TRP #3 = TCI STATE #2)
⬚ PUSCH (TRP #2 = TCI STATE #1)     ⬚ PUSCH (TRP #4 = TCI STATE #3)

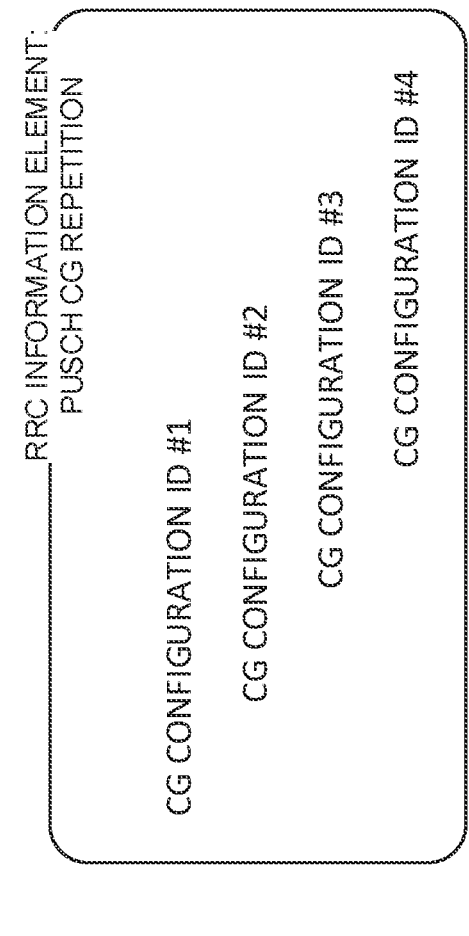
RRC INFORMATION ELEMENT:
PUSCH CG REPETITION
CG CONFIGURATION ID #1
CG CONFIGURATION ID #2
CG CONFIGURATION ID #3
CG CONFIGURATION ID #4
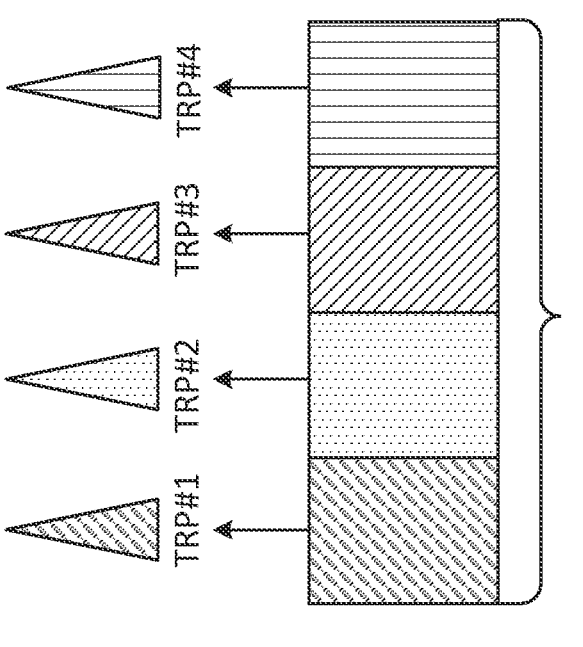
TRP#1   TRP#2   TRP#3   TRP#4
EACH REPETITION IS TRANSMITTED TO EACH TRP
FIG. 7

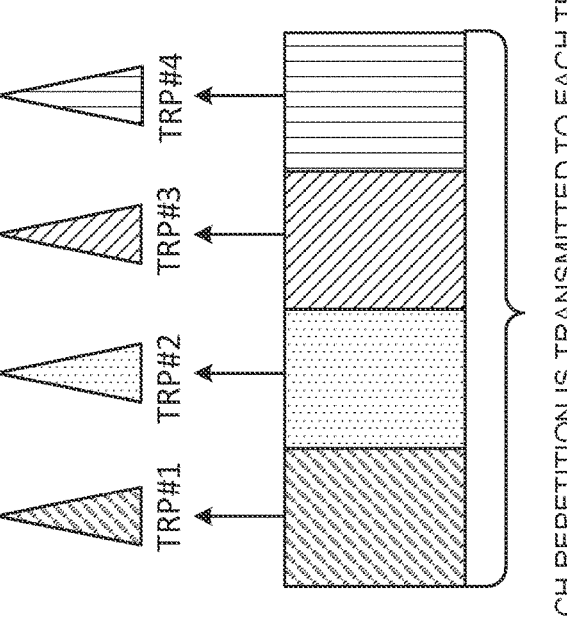

EACH REPETITION IS TRANSMITTED TO EACH TRP

RRC INFORMATION ELEMENT:
CG CONFIGURATION #1
REPETITION NUMBER K

TCI STATE FOR 1st REPETITION: TCI ID #1
TCI STATE FOR 2nd REPETITION: TCI ID #2
TCI STATE FOR 3rd REPETITION: TCI ID #3
TCI STATE FOR 4th REPETITION: TCI ID #4

RRC INFORMATION ELEMENT:
CG CONFIGURATION #2
REPETITION NUMBER K

TCI STATE FOR 1st REPETITION: TCI ID #2
TCI STATE FOR 2nd REPETITION: TCI ID #4
TCI STATE FOR 3rd REPETITION: TCI ID #3
TCI STATE FOR 4th REPETITION: TCI ID #1

TERMINAL, COMMUNICATION METHOD, BASE STATION, AND SYSTEM

CROSS-REFERENCE TO RELATED APPLICATIONS

The present application is a continuation application and, thereby, claims benefit under 35 U.S.C. § 120 to U.S. patent application Ser. No. 17/270,295 filed on Feb. 22, 2021, titled, "USER TERMINAL AND RADIO COMMUNICA-TION METHOD," which is a national stage application of PCT Application No. PCT/JP2018/031606, filed on Aug. 27, 2018. The contents of the priority applications are incorporated by reference in their entirety.

TECHNICAL FIELD

The present disclosure relates to a terminal, a communication method, a base station, and a system of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (LTE Rel. 8 and 9), LTE-Advanced (LTE-A and LTE Rel. 10, 11, 12 and 13) has been specified.

LTE successor systems (also referred to as, for example, Future Radio Access (FRA), the 5th generation mobile communication system (5G), 5G+ (plus), New Radio (NR), New radio access (NX), Future generation radio access (FX) or LTE Rel. 14, 15 or subsequent releases) are also studied.

In legacy LTE systems (e.g., LTE Rel. 8 to 14), a user terminal (UE: User Equipment) controls reception of a downlink shared channel (e.g., PDSCH: Physical Downlink Shared Channel) based on Downlink Control Information (also referred to as, for example, DCI or a DL assignment) transmitted via a downlink control channel (e.g., PDCCH: Physical Downlink Control Channel). Furthermore, the user terminal controls transmission of an uplink shared channel (e.g., PUSCH: Physical Uplink Shared Channel) based on the DCI (also referred to as, for example, a UL grant).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR, 5G, 5G+ or Rel. 15 or subsequent releases) to perform communication by using Beam Forming (BF). Hence, it is studied that the user terminal controls reception processing (e.g., at least one of demapping, demodulation and decoding) of a given channel/signal based on information (Quasi-Co-Location (QCL) information) related to QCL of at least one of the given channel and signal (channel/signal).

The QCL information of the given channel/signal is also referred to as a Transmission Configuration Indication or Transmission Configuration Indicator (TCI) state (TCI state) of the given channel/signal.

By the way, it is studied for the above future radio communication system to perform repetitive transmissions (repetitions) of uplink shared channel (e.g., PUSCH). Furthermore, it is also studied to transmit the uplink shared channel to one or more (one or a plurality of) Transmission and Reception Points (TRPs) every given number of repetitions (e.g., 1 repetition).

However, how to report Channel State Information (CSI) when repetitions of uplink shared channel are transmitted to a plurality of TRPs is not sufficiently studied. Unless CSI can be appropriately reported, there is a risk that communication quality degrades.

It is therefore one of objects of the present disclosure to provide a user terminal and a radio communication method that can appropriately report CSI when transmitting repetitions of uplink shared channel to a plurality of TRPs.

Solution to Problem

A user terminal according to one aspect of the present disclosure includes: a transmitting section that transmits a plurality of uplink shared channels associated with a plurality of transmission and reception points; and a control section that multiplexes a plurality of pieces of channel state information associated with the plurality of transmission and reception points in the plurality of uplink shared channels.

Advantageous Effects of Invention

According to one aspect of the present disclosure, it is possible to appropriately report CSI when uplink shared channel repetitions are transmitted to a plurality of TRPs.

BRIEF DESCRIPTION OF DRAWINGS

FIG. 4A is a diagram illustrating one example of DCI that indicates a TCI state ID per repetition index k, and FIG. 4B is a diagram illustrating one example of DCI that indicates a TCI state ID per RV index p.

FIG. 5 is a diagram illustrating one example of pieces of DCI that indicate single TCI state IDs.

FIGS. 6A to 6D are diagrams illustrating one example of relationships between TCI states indicated by TCI fields, and RVs indicated by RV fields.

FIG. 7 is a diagram illustrating one example of CG configurations applied to configured grant-based PUSCH repetitions.

FIG. 9 is a diagram illustrating another example of CG configurations applied to configured grant-based PUSCH repetitions.

FIG. 11 is a diagram illustrating another example of the CSI reporting.

DESCRIPTION OF EMBODIMENTS (Repetitions)

It is studied for NR that the UE performs multi-slot transmission on channels such as a PUCCH and a PUSCH. Multi-slot transmission is transmission over a plurality of slots, and may be referred to as slot aggregation or repetitions. Thanks to multi-slot transmission, it is possible to expect expansion of a coverage and improvement of received quality.

When, for example, the UE is configured to repeatedly transmit a given channel by using a higher layer signaling, a physical layer signaling or a combination of these signalings, the UE may repeatedly transmit the given channel. In each slot of multi-slot transmission, a signal of the same contents may be transmitted, or a signal of different contents may be transmitted.

In addition, in the present disclosure, the higher layer signaling may be one or a combination of, for example, a Radio Resource Control (RRC) signaling, a Medium Access Control (MAC) signaling and broadcast information.

The MAC signaling may use, for example, an MAC Control Element (MAC CE), an MAC Protocol Data Unit (PDU) and so on. The broadcast information may be, for example, a Master Information Block (MIB), a System Information Block (SIB), Remaining Minimum System Information (RMSI), Other System Information (OSI) and so on.

The physical layer signaling may be, for example, Downlink Control Information (DCI).

A repetition number of PUSCH repetition may be configured to the UE by a higher layer signaling, (e.g., an RRC parameter "aggregationFactorUL" as for a PUSCH, and an RRC parameter "repK" as for a configured grant PUSCH). For example, 1, 2, 4 or 8 may be configured to the repetition number of PUSCH repetition. Furthermore, a Redundancy Version (RV) of a PUSCH in each slot during PUSCH repetitions may be each different or may be the same.

PUCCH repetition may be configured to the UE in association with specific formats (e.g., PUCCH formats 1, 3 and 4 whose transmission durations are 4 symbols or more).

The repetition number (a repetition factor such as a parameter "nrofSlots" included in "PUCCH-FormatConfig" of RRC) may be commonly configured to all of the PUCCH formats 1, 3 and 4.

In addition, in the present disclosure, the repetition number, a repetition factor, a repetition coefficient and K may be interchangeably read. Furthermore, the repetition number may represent a repetition number of specific UL transmission (e.g., a PUSCH or a PUCCH).

It is studied for the future radio communication system to repeatedly transmit at least one of a channel and a signal (channel/signal). More specifically, it is studied to repeatedly transmit a channel/signal assuming a plurality of Transmission and Reception Points (TRPs).

The channel/signal is, for example, a PDSCH, a PDCCH, a PUSCH, a PUCCH, a DL-RS or an Uplink Reference Signal (UL-RS), yet is not limited to these.

Figure 1A:
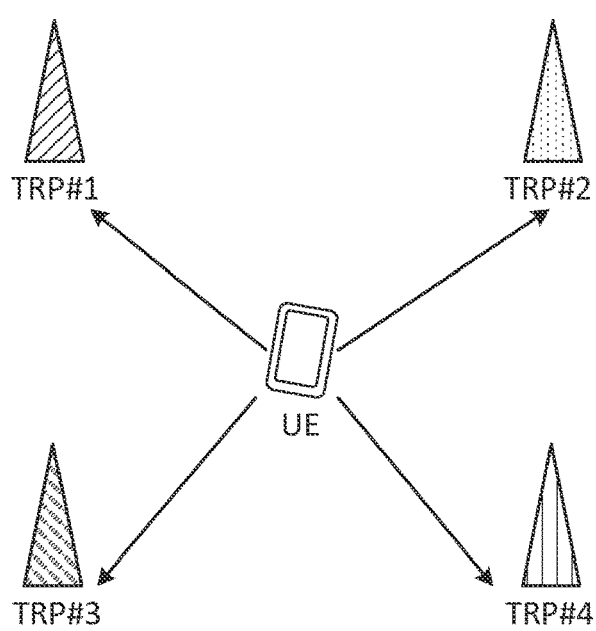
FIGS. 1A and 1B are diagrams illustrating one example of channel/signal repetitions that use a plurality of TRPs.
Figure 1B:
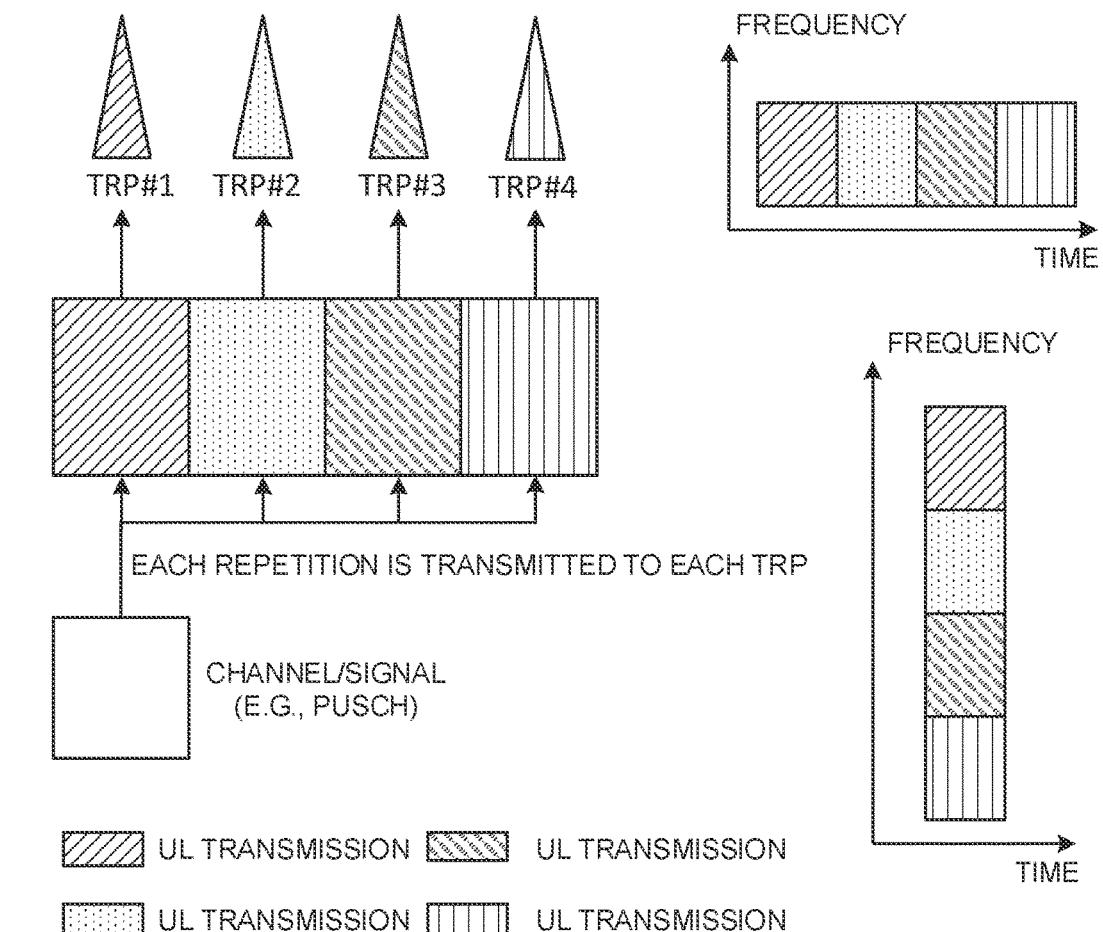

FIGS. 1A and 1B are diagrams illustrating one example of channel/signal repetitions that use a plurality of TRPs. For example, FIGS. 1A and 1B illustrate one example of PUSCH repetitions that use TRPs #1 to #4. In addition, FIG. 1A illustrates one example where geographical locations (TCI states or quasi-co-locations) of the TRPs #1 to #4 are different. However, the present embodiment is not limited to this. The TRPs #1 to #4 may be different antenna panels that are installed at the same transmission place. Furthermore, the number of TRPs used for repetitions is not also limited to those illustrated in FIG. 1.

As illustrated in FIG. 1B, a plurality of an same PUSCH (or UL data) may be copied, and the PUSCH may be transmitted as repetition. What are plurally copied in this way may be information bit sequences, code blocks, transport blocks or encoded codeword sequences to be repeatedly transmitted on the PUSCH. Alternatively, a plurality of copies may not necessarily represent the same bit sequence, but may be part of a codeword generated from the same information bit sequence or part of a modulated symbol sequence. For example, each of a plurality of copies may be a different Redundancy Version (RV) or the same RV of a codeword obtained by encoding a certain information bit sequence. Alternatively, each of a plurality of copies may be a modulated symbol sequence obtained by modulating the different RVs or the same RV. Furthermore, each of a plurality of copies is each transmitted as a PUSCH. The PUSCH may be repeatedly transmitted in resources whose at least one of a time domain and a frequency domain is different.

As illustrated in, for example, FIG. 1B, a PUSCH may be repeated in resources (e.g., one or more slots) whose frequency domain is same and that are contiguous in the time domain. Alternatively, the PUSCH may be repeated in resources (e.g., one or more Resource Blocks (RBs) or an RB Group (RBG) including the one or more RBs) whose time domain is same and that are contiguous in the frequency domain. Each repetition may be transmitted to different TRPs.

In addition, FIG. 1 illustrates the case where a plurality of resources associated with different repetitions are each contiguous in the time domain or the frequency domain. However, a plurality of resources may not be contiguous. Furthermore, a plurality of these resources may be resources whose both of the time domain and the frequency domain are different.

Furthermore, FIG. 1 illustrates the case where the PUSCH is transmitted to one or more TRPs per repetition. However, the present embodiment is not limited to this. A PUSCH may be transmitted to one or more TRPs every given number of repetitions (one or more repetitions).

In addition, the "TRP" may be paraphrased as, for example, a network, a base station, an antenna apparatus, an antenna panel, a serving cell, a cell, a Component Carrier (CC), a carrier and so on. Furthermore, that "TRPs are same" for different transmission/received signals or channels may be paraphrased as that a TCI state, QCL or a QCL relationship, precoding, beam forming or a spatial reception parameter is same between the different transmission/received signals or channels or between reference signals of the different transmission/received signals or channels. Furthermore, that "TRPs are different" for different transmission/received signals or channels may be paraphrased as that a TCI state, QCL or a QCL relationship, precoding, beam forming or a spatial reception parameter is different between the different transmission/received signals or channels or between reference signals of the different transmission/received signals or channels.

(QCL)

QCL (Quasi-Co-Location) is an index that indicates a statistical property of a channel/signal, and is also referred to as Quasi-Co-Location. The UE may control reception processing or transmission processing of a given channel/signal based on information related to QCL (QCL information) of at least one of a given channel and signal (channel/signal). The reception processing corresponds to at least one of, for example, demapping, demodulation and decoding. The transmission processing corresponds to at least one of mapping, modulation and encoding.

When, for example, a certain signal and another signal have a QCL relationship, the QCL relationship may mean that it is possible to assume that at least one of a doppler shift, a doppler spread, an average delay, a delay spread and a spatial parameter (e.g., spatial reception parameter (spatial Rx parameter)) is same (the QCL holds for at least one of these parameters) between a plurality of these different signals.

In addition, the spatial reception parameter may be associated with a reception beam (e.g., reception analog beam) or a transmission beam (e.g., transmission analog beam) of the user terminal, and a beam may be specified based on spatial QCL. The QCL and at least one element of the QCL in the present disclosure may be read as spatial QCL (sQCL).

A plurality of types of QCL (QCL types) may be specified. For example, four QCL types A to D whose parameters (or parameter sets) that can be assumed same are different may be provided, and the parameters are as follows:

QCL type A: doppler shift, doppler spread, average delay and delay spread,

QCL type B: doppler shift and doppler spread,

QCL type C: doppler shift and average delay, and

QCL type D: spatial reception parameter.

The Transmission Configuration Indication or Transmission Configuration Indicator (TCI) state (TCI state (TCI-state)) may indicate QCL information of the given channel/signal (e.g., a PDSCH, a PDCCH, a PUCCH or a PUSCH).

The TCI state may be identified based on a given identifier (TCI state ID (TCI-StateId)), and indicate (include) information (QCL information (QCL-Info)) that relates to QCL of a target channel/signal (or a reference signal (or an antenna port of the reference signal) for the target channel) and another signal (e.g., another Downlink Reference Signal (DL-RS) or an Uplink Reference Signal (UL-RS)).

The QCL information may include at least one of, for example, information (RS relation information) that relates to a DL-RS or a UL-RS (also referred to simply as an RS below) that has the QCL relationship with the target channel/signal, information (QCL type information) that indicates the above QCL type, and information that relates to a carrier (cell) and a BWP in which the RS is arranged.

The RS relation information may include information that indicates at least one of an RS that has the QCL relationship with the target channel/signal, and a resource of the RS. When, for example, a plurality of Reference Signal sets (RS sets) are configured to the user terminal, the RS relation information may indicate at least one of an RS that has the QCL relationship with a channel (or a port for the channel) among RSs included in the RS sets, and a resource for the RS.

The DL-RS may be at least one of, for example, a Synchronization Signal (SS), a broadcast channel (PBCH: Physical Broadcast Channel), a Synchronization Signal Block (SSB), a Mobility Reference Signal (MRS: Mobility RS), a Channel State Information-Reference Signal (CSI-RS), a CSI-RS for tracking and a beam-specific signal, or a signal that is configured by expanding or changing these signals (e.g., a signal that is configured by changing at least one of a density and a periodicity).

The synchronization signal may be at least one of, for example, a Primary Synchronization Signal (PSS) and a Secondary Synchronization Signal (SSS). The SSB is a signal block that includes a synchronization signal and a broadcast channel, and may be referred to as an SS/PBCH block.

The UL-RS may be, for example, a Sounding Reference Signal (SRS).

(CSI Reporting)

According to NR, the UE measures a channel state by using a given reference signal (or a resource for the given reference signal), and feeds back (reports) Channel State Information (CSI) to a base station.

The UE may measure the channel state by using a Channel State Information Reference Signal (CSI-RS), a Synchronization Signal/Physical Broadcast Channel (SS/PBCH) block, a Synchronization Signal (SS) or a DeModulation Reference Signal (DMRS).

The CSI-RS resource may include at least one of a Non Zero Power (NZP) CSI-RS and CSI-Interference Management (IM). The SS/PBCH block is a block that includes a synchronization signal (e.g., a Primary Synchronization Signal (PSS) or a Secondary Synchronization Signal (SSS)) and a PBCH (and a corresponding DMRS), and may be referred to as an SS Block (SSB).

In addition, the CSI may include at least one of a Channel Quality Indicator (CQI), a Precoding Matrix Indicator (PMI), a CSI-RS Resource Indicator (CRI), an SS/PBCH Block Resource Indicator (SSBRI), a Layer Indicator (LI), a Rank Indicator (RI), a Layer 1 Reference Signal Received Power (L1-RSRP), L1-Reference Signal Received Quality (RSRQ), an L1-Signal to Interference plus Noise Ratio (SINR), an L1-Signal to Noise Ratio (SNR) and so on.

The CSI may include a plurality of parts. A CSI part 1 may include information (e.g., RI) of a relatively small number of bits. A CSI part 2 may include information (e.g., CQI) of a relatively large number of bits such as information determined based on the CSI part 1.

As a CSI feedback method, a Periodic CSI (P-CSI) reporting, an Aperiodic CSI (A-CSI) reporting and a Semi-Persistent CSI (SP-CSI) reporting are studied.

The UE may be notified of CSI measurement configuration information (e.g., RRC information element "CSI-MeasConfig") by using a higher layer signaling, a physical layer signaling (e.g., Downlink Control Information (DCI)) or a combination of these signalings. The CSI measurement configuration information may be configured by using, for example, the RRC information element "CSI-ReportConfig".

The CSI measurement configuration information may include CSI resource configuration information (RRC information element "CSI-ResourceConfig") and CSI reporting configuration information (RRC information element "CSI-ReportConfig").

The CSI resource configuration information may include information (e.g., a CSI-RS resource set ID or an SSB resource set ID) for specifying a measurement target resource.

The CSI reporting configuration information may include at least one of a reporting configuration ID (CSI-ReportConfigId), a reporting type (e.g., a P-CSI reporting, an A-CSI reporting, an SP-CSI that uses a PUCCH or an SP-CSI reporting that uses a PUSCH), the report periodicity (ReportPeriodicity), an offset (ReportSlotOffset) and information (CSI-ResourceConfigId) that indicates which CSI measured by using which reference signal (or which resource) to report.

The SP-CSI reporting (PUCCH-based SP-CSI reporting) that uses the PUCCH may be activated by an MAC CE. The SP-CSI reporting (PUSCH-based SP-CSI reporting) that uses the PUSCH and the A-CSI reporting that uses the PUSCH may be activated (or triggered) by DCI.

For example, a CSI request field included in the DCI may indicate a trigger state. The trigger state may be configured by a higher layer signaling (e.g., RRC signaling). A list of trigger states for the A-CSI reporting may be configured by an RRC information element "CSI-AperiodicTriggerStateList". A list of trigger states for the SP-CSI reporting may be configured by an RRC information element "CSI-SemiPersistentOnPUSCH-TriggerStateList". Each trigger state may be associated with one or a plurality of report configuration IDs (CSI-ReportConfigId).
(UCI on PUSCH)

According to NR, when UCI transmission that uses a PUCCH and PUSCH transmission occur at the same or overlapping timing, the UE may transmit both of UCI and uplink data (UL-SCH: Uplink Shared Channel) by using a PUSCH.

Multiplexing UCI on a PUSCH to transmit may be referred to as UCI on PUSCH, UCI multiplexing on PUSCH or UCI piggyback on PUSCH.

On the other hand, it is also studied for NR to transmit UCI on a PUSCH without transmitting uplink data (UL-SCH) (UCI on PUSCH without UL-SCH).

The UE may multiplex UCI by rate-matching the PUSCH. Rate-matching processing refers to controlling the number of bits after encoding (encoded bits) by taking actually available radio resources into account. When the number of encoded bits is smaller than the number of bits that can be mapped on the actually available radio resources, at least part of the encoded bits may be repeated. When the number of encoded bits is larger than the number of bits that can be mapped, part of the encoded bits may be deleted.

However, how the UE reports CSI during PUSCH repetitions to a plurality of TRPs is not determined.

Hence, the inventors of the present invention have conceived a method for reporting CSI during PUSCH repetitions to a plurality of TRPs.

An embodiment according to the present disclosure will be described in detail below with reference to the drawings.

A radio communication method according to each embodiment may be each applied alone or may be applied in combination.

The present embodiment will be described in detail below with reference to the drawings. A case where a PUSCH is transmitted to a different TRP per repetition will be cited as an example and described below. However, the PUSCH only needs to be transmitted to a different TRP every given number of repetitions (one or more repetitions). In addition, the following description will cite an example of PUSCH repetitions. However, the present embodiment may be applied likewise to a UL signal or a UL channel other than the PUSCH, too.
—PUSCH Repetitions—

The UE may transmit UL data (encoded data or an Uplink-Shared Channel (UL-SCH)) derived from the same Transport Block (TB) during each repetition (PUSCH) of PUSCH repetitions to a plurality of TRPs. UL data of each repetition of PUSCH repetitions may include the same HARQ Process Number (HPN (ID)). The TB may be read as a code block or a Code Block Group (CBG) including one or more code blocks.

The UE may use a different RV for each repetition (UL data) of PUSCH repetitions.

Information for giving notification of the HPN of certain PUSCH repetitions and the RV of each repetition may be included in DCI for scheduling a PUSCH and notified by a base station to the user terminal, or may be notified as part of UCI to be multiplexed on the PUSCH by the user terminal to the base station. Alternatively, the information may be uniquely determined according to a given rule (e.g., time/ frequency resources used for the PUSCH or a DMRS sequence to be multiplexed on the PUSCH).

The UE may transmit a UL signal or a UL channel by using a transmission beam (at least one of QCL, a TCI state and spatial relation information) associated with a TRP. The transmission beam may be associated with a TRP (an RS from the TRP) (or may be based on the RS from the TRP).

Each repetition of PUSCH repetitions may be associated with a TRP (transmission beam). The UE may use a corresponding transmission beam for each repetition.

A case where a PUSCH is transmitted to a different TRP per repetition will be cited as an example and described below. However, the PUSCH only needs to be transmitted to a different TRP every given number of repetitions (one or more repetitions). In addition, the following description will cite an example of PUSCH repetitions. However, the present embodiment may be applied likewise to a UL signal or a UL channel other than the PUSCH, too.

The UE may perform PUSCH repetitions according to at least one of a following first aspect to fourth aspect.

First Aspect

According to the first aspect, transmission of a PUSCH is controlled based on at least one of quasi-co-location, a TCI state, an SRS Resource Indicator (SRI) and spatial relation information (spatialrelationinfo) associated with a given number of repetitions (e.g., 1 repetition) of the PUSCH. Furthermore, a UE may assume that one or more antenna ports of a DMRS of the PUSCH is quasi-co-located with an RS indicated by the quasi-co-location, the TCI state, the SRI or the spatial relation information.

First, the TCI state·SRI for the PUSCH, and the spatial relation information will be described.

<TCI State·SRI for PUSCH>

The TCI state or the SRI (also referred to as the TCI state SRI below) for the PUSCH may include QCL information related to QCL of the PUSCH. More specifically, the TCI state SRI may include QCL information related to QCL of a DeModulation Reference Signal (DMRS) of the PUSCH (an antenna port of the DMRS (DMRS port) or a group of the DMRS ports (DMRS port group)), and a given RS (e.g., an SSB, a CSI-RS, a Tracking Reference Signal (TRS) or an SRS). Generally, the TCI state indicates a case where the given RS described above is the SSB, the CSI-RS or the TRS, and the SRI indicates a case where the given RS described above is the SRS.

M (M≥1) TCI states for PUSCHs (QCL information of the M PUSCHs) or M SRS resources may be notified (configured) to the UE by a higher layer signaling. In addition, the number M of TCI states or SRS resources configured to the user terminal may be restricted according to at least one of capability of the user terminal (UE capability) and a QCL type.

DCI used to schedule a PUSCH or DCI used to activate configured grant-based transmission may include a given field (that may be referred to as, for example, a field for a TCI, a TCI field or a TCI state field) that indicates a TCI state (QCL information for the PUSCH), or a given field (e.g., SRS Resource Indicator (SRI)) that indicates an SRS resource. The DCI may be referred to as, for example, UL DCI, a DCI format 0_0 and a DCI format 0_1.

When the DCI includes a TCI field or an SRI of x bits (e.g., x=3), the base station may configure TCI states of $2^x$ (e.g., 8 in a case of x=3) types at maximum to the user terminal in advance by using a higher layer signaling. A value of a TCI field (TCI field value) or a value of an SRI field (SRI field value) in DCI may indicate one of a TCI state and an SRS resource configured in advance by the higher layer signaling.

When TCI states or SRS resources of more than 8 types are configured to the user terminal, the TCI states or the SRS resources of 8 types or less may be activated (or indicated) by using an MAC CE. The value of the TCI field or the SRI field in the DCI may indicate one of the TCI state and the SRS resource activated by the MAC CE.

The user terminal may determine QCL related to a PUSCH based on the TCI state indicated by the TCI field value in the DCI. More specifically, the user terminal may control transmission processing (e.g., encoding and modulation) of the PUSCH assuming that a DMRS (a DMRS port or a DMRS port group) of the PUSCH is in QCL with an RS associated with a TCI state notified by the DCI. Alternatively, the user terminal may determine QCL related to the PUSCH based on the SRS resource indicated by the SRI field value in the DCI. More specifically, the user terminal may control transmission processing (e.g., encoding and modulation) of the PUSCH assuming that the DMRS (the DMRS port or the DMRS port group) of the PUSCH is in QCL with an SRS associated with the SRI field value notified by the DCI.

<Spatial Relation Information>

Spatial relation information (spatialrelationinfo) for a PUSCH corresponds to information that indicates a configuration of a spatial association between a reference RS and a PUSCH. For example, a plurality of candidate beams for PUSCH transmission may be configured based on PUSCH spatial relation information. The PUSCH spatial relation information is notified to the UE by a higher layer (e.g., RRC signaling).

The PUSCH spatial relation information may be configured to include at least one entry (PUCCH spatial relation information IE (Information Element)). Each entry may indicate an ID associated with the reference RS. More specifically, each entry may include at least one of an SSB index, a Non-Zero Power (NZP)-CSI-RS resource configuration ID and an SRS resource configuration ID. The SSB index, the NZP-CSI-RS resource configuration ID and the SRS resource configuration ID may be associated with a beam, a resource and/or a port selected by measuring the reference RS.

One of a plurality of entries (candidate beams or PUSCH spatial relation information) may be instructed by an MAC CE. This MAC CE may be referred to as a spatial information MAC CE. The spatial information MAC CE may indicate an entry index used for PUSCH transmission. When the PUSCH spatial relation information includes one PUSCH spatial relation information IE, the MAC CE may not be used.

When determining one entry, the UE may transmit a PUSCH based on PUSCH spatial relation information associated with the entry. When the reference RS is a downlink RS (an SSB or a CSI-RS), the entry is associated with a reception beam selected based on measurement of the reference RS, and the UE may transmit the PUSCH by using a transmission beam associated with the reception beam associated with the entry. Alternatively, a base station receiver may transmit a PUSCH by, for example, using a transmission beam, precoding, an antenna port or an antenna panel that makes it possible to assume the downlink RS (the SSB or the CSI-RS) associated with the entry and spatial Quasi-Co-Location (QCL).

When the reference RS is an uplink RS (SRS), an entry is associated with a transmission beam selected based on measurement of the reference RS, and the UE may transmit the PUSCH by using a transmission beam associated with the entry. Alternatively, the base station receiver may transmit a PUSCH by using, for example, a transmission beam, precoding, an antenna port or an antenna panel that makes it possible to assume the uplink RS (SRS) associated with the entry and spatial QCL. The PUSCH spatial relation information may be referred to as a PUCCH beam, a transmission beam, an uplink beam or a beam.

Next, a case where at least one of quasi-co-location, a TCI state and spatial relation information is associated with given repetition during PUSCH repetitions will be described. In addition, the following description will describe a case where the TCI state is associated with repetitions. However, the TCI state may be read as at least one of quasi-co-location, an SRI and spatial relation information in this description. In one example, the TCI state may be replaced with the SRI in the following description.

Repetition of the PUSCH may be identified based on a given index (repetition index) k. The repetition index k may indicate how many times repetition has been performed. For example, repetition index k=0, 1, 2, . . . and K−1 may indicate first, second, third, . . . and Kth repetitions.

Furthermore, the number of times of all repetitions of the PUSCH may be referred to as a repetition factor K. For example, the repetition factor K is configured as 2, 4 or 8, yet is not limited to this.

At least one of the above repetition index k and repetition factor K may be transmitted to the user terminal by at least one of a higher layer signaling (e.g., an RRC signaling or an MAC CE) and a physical layer signaling (e.g., DCI).

When a PUSCH is transmitted to a different TRP every given number of repetitions, a TCI state may be associated with the given number of repetitions (e.g., 1 repetition), or may be associated with the repetition index k that indicates the given number of repetitions.

Figure 2A:
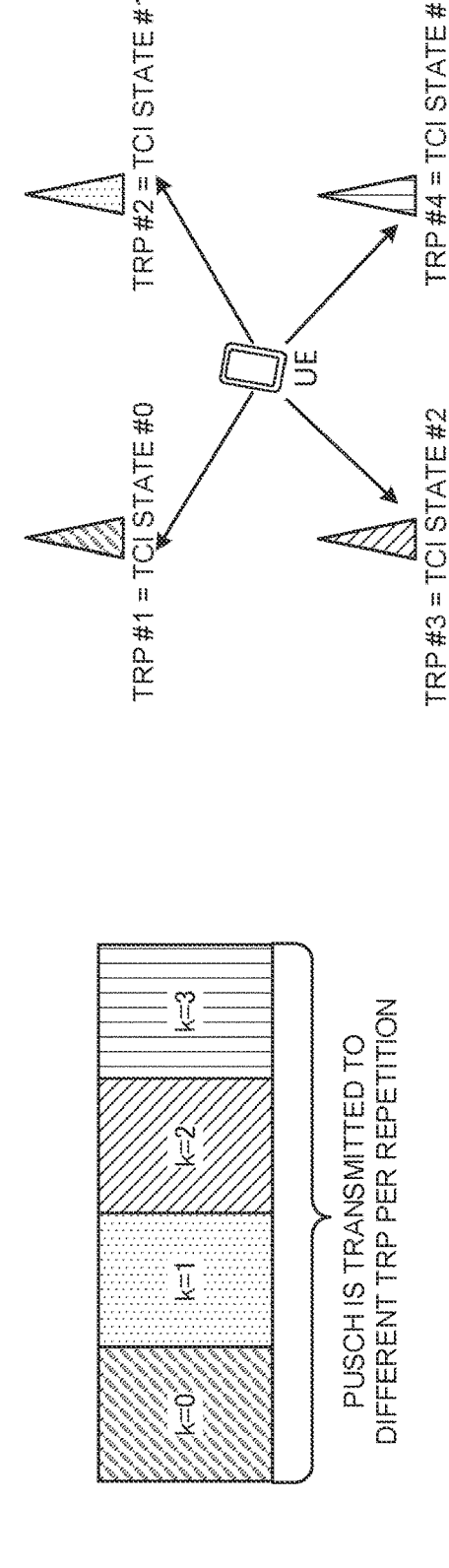
FIGS. 2A and 2B are diagrams illustrating one example of TCI states associated with repetition indices according to a first aspect.
Figure 2B:
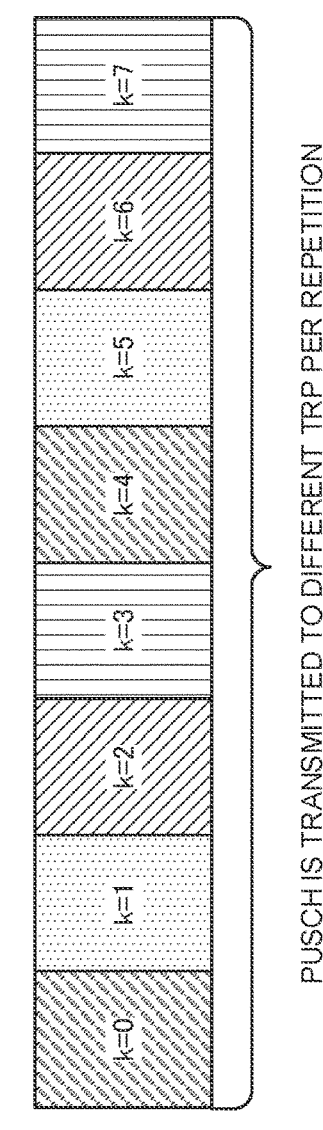

FIGS. 2A and 2B are diagrams illustrating one example of TCI states associated with repetition indices according to the first aspect. FIGS. 2A and 2B respectively assume cases where the repetition factor K is 4 and 8. However, values of the repetition factor K are not limited to these.

Furthermore, FIGS. 2A and 2B assume that Y TCI states are configured to the user terminal (notified from a TRP) by a higher layer signaling.

As illustrated in FIGS. 2A and 2B, the repetition index k (k=0, 1, 2, . . . and K−1) may be associated with a given TCI state identifier (TCI state ID) y. More specifically, the repetition index k may be associated with a modulo (y mod Y) obtained by dividing the TCI state ID y by a total number Y of TCI states configured to the user terminal.

For example, in FIG. 2A, repetition index k=0, 1, 2, and 3 are associated with TCI state ID y=0, 1, 2 and 3, respectively. Furthermore, PUSCHs of repetition index k=0, 1, 2 and 3 are respectively transmitted to TRPs #1, #2, #3 and #4 associated with TCI state ID y=0, 1, 2 and 3.

Furthermore, in FIG. 2B, repetition index k=0, 1, 2, 3, 4, 5, 6, and 7 are associated with TCI state ID y=0, 1, 2, 3, 0, 1, 2 and 3, respectively. Furthermore, PUSCHs of repetition index k=0, 1, 2, 3, 4, 5, 6, and 7 are respectively transmitted to TRPs #1, #2, #3, #4, #1, #2, #3 and #4 associated with TCI state ID y=0, 1, 2, 3, 0, 1, 2 and 3.

In addition, a TCI state of a PUSCH (or a DMRS for PUSCH demodulation) associated with each repetition may be configured to the UE by at least one of an RRC signaling, an MAC CE and DCI. For example, information that indicates the TCI state ID associated with the repetition index k may be notified from the base station (or a given TRP) to the user terminal by at least one of the RRC signaling, the MAC CE and the DCI. Alternatively, the user terminal may derive the TCI state ID associated with the repetition index k based on, for example, the repetition index k and the above total number Y of TCI states.

Furthermore, in FIGS. 2A and 2B, a different TCI state ID (TRP) is associated with each repetition index k. However, the present embodiment is not limited to this. At least part of repetitions in the repetition factor K may be associated with different TCI state IDs (TRPs). That is, at least part of repetitions in the repetition factor K may be associated with a same TCI state (TRP).

Furthermore, in FIGS. 2A and 2B, an RV (a value of an RV index p) of each repetition in the repetition factor K may be fixed, or may go around in a given order.

According to the first aspect, the TCI state and PUSCH repetition (or the repetition index k) are associated, so that, even when the UE transmits a PUSCH to a different TRP every given number of repetitions, it is possible to appropriately control transmission of the PUSCH.

Second Aspect

According to the second aspect, a user terminal controls transmission of a PUSCH based on a TCI state associated with a Redundancy Version (RV) of the PUSCH. Differences of the second aspect from the first aspect will be mainly described.

The Redundancy Version (RV) is used to encode and rate-match UL data, and indicates a difference in redundancy of the UL data. The Redundancy Version value (RV value) is, for example, 0, 1, 2 or 3, and 0 indicates the lowest degree of redundancy and therefore is used for initial transmission.

By applying a different RV value per transmission of UL data of a same HARQ Process Number (HPN), a probability that UL data can be normally received (decoded) increases, so that it is possible to effectively obtain an HARQ gain. The RV may be included in DCI and notified to a UE, so that it is possible to prevent a mismatch of recognition of the RV between a base station and the UE. In addition, 0, 0, 0 and 0 or 0, 3, 0 and 3 may be used as values of another redundancy version for repetitions.

The RV of the PUSCH may be fixed, or may go around in a given order (e.g., 0→2→3→1) between K repetitions. The RV may be identified based on a given index (RV index) p.

When a PUSCH is transmitted to a different TRP every given number of repetitions, a TCI state may be associated with an RV, or may be associated with the RV index p that indicates the RV.

Figures 3A, 3B:
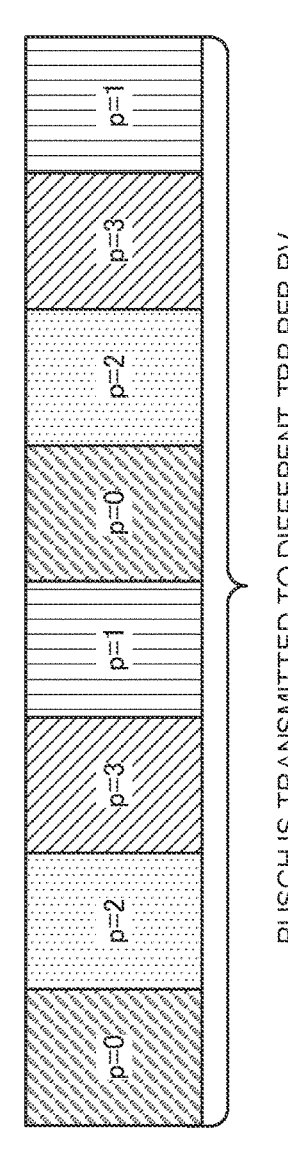
FIGS. 3A and 3B are diagrams illustrating one example of TCI states associated with an RV index p according to a second aspect.

FIGS. 3A and 3B are diagrams illustrating one example of TCI states associated with the RV index p according to the second aspect. Differences of FIGS. 3A and 3B from FIGS. 2A and 2B will be mainly described by omitting description of similar points to those in FIGS. 2A and 2B.

As illustrated in FIGS. 3A and 3B, the RV index p may be associated with a given TCI state identifier (TCI state ID) y (or a TCI state of the TCI state ID). For example, the RV index p may be associated with a modulo (y mod Y) obtained by dividing the TCI state ID y by a total number Y of TCI states configured to the UE.

For example, in FIG. 3A, RV index p=0, 2, 3 and 1 are associated with TCI state ID y=0, 1, 2 and 3, respectively. Furthermore, PUSCHs of RV index p=0, 2, 3 and 1 are respectively transmitted from TRPs #1, #2, #3 and #4 associated with TCI state ID y=0, 1, 2 and 3.

Furthermore, in FIG. 3B, the RV index goes around in a given order (e.g., 0→2→3→1), so that the RV indices p of repetition index k=0, 1, 2, 3, 4, 5, 6 and 7 are respectively p=0, 1, 2, 3, 0, 1, 2 and 3. In FIG. 3B, PUSCHs of RV index p=0, 2, 3 and 1 are transmitted from the TRPs #1, #2, #3 and #4 associated with the TCI state ID y=0, 1, 2 and 3.

A TCI state of a PUSCH (or a DMRS for PUSCH demodulation) associated with each RV may be configured to the UE by at least one of an RRC signaling, an MAC CE and DCI. For example, information that indicates a TCI state ID associated with the RV index p may be notified from a TRP to the user terminal by at least one of a higher layer signaling (e.g., an RRC signaling or an MAC CE) and a physical layer signaling (e.g., DCI). Alternatively, the user terminal may derive the TCI state ID associated with the RV index p based on, for example, the RV index p and the above total number Y of TCI states.

Furthermore, in FIGS. 3A and 3B, a different TCI state ID (TRP) is associated with each RV index p. However, the present embodiment is not limited to this. At least part of RVs in a repetition factor K may be associated with different TCI state IDs (TRPs). That is, at least part of RVs in the repetition factor K may be associated with a same TCI state (TRP).

According to the second aspect, a TCI state and an RV (or the RV index p) are associated, so that, even when the UE transmits a PUSCH to a different TRP every given number of repetitions, it is possible to appropriately control transmission of the PUSCH.

Third Aspect

The third aspect will describe DCI that indicates a TCI state associated with a repetition index k or an RV index p in the first or second aspect. In this regard, the DCI may be DCI for scheduling a PUSCH, or may be DCI for instructing activation of configured grant-based transmission.

First Example

A user terminal may receive DCI for scheduling (or activating) PUSCHs to all repetitions. A given field value in the DCI may indicate a TCI state of each repetition index k or each RV index p.

The given field may be referred to as, for example, a TCI field, a TCI state field, a field for a TCI state or a first field. Furthermore, the given field may be included when, for example, a higher layer signaling indicates given information (e.g., PresentInDCI or SRI). Furthermore, the given field may include a given number of bits (e.g., 3 bits).

In the first example, the given field value in the DCI may indicate one or more TCI state IDs. FIG. 4A is a diagram illustrating one example of DCI that indicates a TCI state ID of each repetition index k. FIG. 4B is a diagram illustrating one example of DCI that indicates a TCI state ID of each RV index p. In addition, FIGS. 4A and 4B are only exemplary, and the numbers of bits and values of the given fields in the DCI, and TCI state IDs indicated by the values are not limited to those illustrated in FIGS. 4A and 4B.

As illustrated in FIG. 4A, each value of the given field in the DCI may indicate the TCI state ID of each repetition index k in a repetition factor K. In, for example, FIG. 4A, a single value of the given field indicates a TCI state ID of each repetition index k in the repetition factor K (when, for example, the value is "000", "000" indicates a TCI state ID #0 for k=0, a TCI state ID #1 for k=1, a TCI state ID #2 for k=2 and . . . ).

On the other hand, as illustrated in FIG. 4B, each value of the given field in the DCI may indicate the TCI state ID of each RV index p in the repetition factor K. In, for example, FIG. 4B, a single value of the given field indicates a TCI state ID of each RV index p in the repetition factor K (when, for example, the value is "000", "000" indicates a TCI state ID #0 for p=0, a TCI state ID #1 for p=2, a TCI state ID #2 for p=3 and . . . ).

As illustrated in FIGS. 4A and 4B, thanks to the single DCI, even when all repetitions of the PUSCH of the repetition factor K are scheduled, the user terminal can recognize a TCI state of each repetition or each RV in the repetition factor K based on a given field value in the DCI.

In addition, in the cases illustrated in FIGS. 4A and 4B, DCI may include other fields that indicate the repetition factor K. Alternatively, the above given field value may indicate the repetition factor K. For example, the user terminal may determine a value obtained by adding 1 to a maximum value of the repetition index k as the repetition factor K.

Second Example

Alternatively, the user terminal may receive DCI for scheduling (or activating) a PUSCH every given number of repetitions (e.g., 1 repetition). A given field value in the DCI may indicate the TCI state every given number of repetitions.

In the second example, the given field value in the DCI may indicate a single TCI state ID. When, for example, DCI is transmitted per repetition index k, the given field value in the DCI may indicate a TCI state ID of the repetition index k scheduled by the DCI.

FIG. 5 is a diagram illustrating one example of DCI that indicates a single TCI state ID. For example, in FIG. 5, the single DCI may be used to schedule a PUSCH of the given repetition index k. In this case, the given field in the DCI may indicate the TCI state ID of the given repetition index k.

Alternatively, the single DCI may be used to schedule a PUSCH of the given RV index p. In this case, the given field in the DCI may indicate a TCI state ID of the given RV index p.

<Others>

DCI may include a given field (that is also referred to as, for example, a second field, an RV field or an RV index field) that indicates an RV index in addition to the above-described TCI field. The RV field may include a given number of bits (e.g., 2 bits).

FIGS. 6A to 6D are diagrams illustrating one example of relationships between TCI states indicated by TCI fields and RVs indicated by RV fields. For example, FIGS. 6A to 6D exemplify the cases where the repetition factor K is 4. However, the repetition factor K is not limited to this.

Furthermore, in FIGS. 6A to 6D, a PUSCH of the repetition factor K may be scheduled by single DCI, or may be scheduled by DCI of each repetition index k.

In FIGS. 6A, values of TCI fields (e.g., FIGS. 4A and 5) in DCI may indicate TCI state ID=0, 1, 2 and 3 of respective repetition index k=0, 1, 2 and 3. On the other hand, a value of the RV field in the DCI indicates 0 in RV index, and therefore RV index p=0, 2, 3 and 1 of respective repetition index k=0, 1, 2 and 3 may be indicated according to a given order.

FIG. 6B illustrates the TCI state ID of each repetition index k similar to FIG. 6A. On the other hand, the value of the RV field in the DCI indicates 3 in RV index, and therefore RV index p=3, 1, 0 and 2 of respective repetition index k=0, 1, 2 and 3 may be indicated according to a given order.

In FIGS. 6C, the values of TCI fields (e.g., FIGS. 4A and 5) in the DCI may indicate TCI state ID=1, 3, 2 and 0 of respective repetition index k=0, 1, 2 and 3. FIG. 6C illustrates the RV index of each repetition index k similar to FIG. 6B.

In FIGS. 6D, the values of the TCI fields (e.g., FIGS. 4A and 5) in the DCI indicate same TCI state ID=0 across repetition index k=0, 1, 2 and 3. Furthermore, the value of the RV field in the DCI indicates 2 in RV index, and therefore RV index p=2, 3, 1 and 0 of respective repetition index k=0, 1, 2 and 3 may be indicated according to a given order.

Thus, the RV indices (RV sequences) and the TCI states may not be associated, and may be indicated by different fields.

According to the third aspect, a given field value of DCI indicates a TCI state associated with repetition or an RV of a PUSCH, so that, even when the UE transmits a PUSCH to a different TRP every given number of repetitions, it is possible to appropriately control transmission of the PUSCHs.

Fourth Aspect

The fourth aspect will describe a case where configured grant-based PUSCHs for transmitting PUSCHs without scheduling (or a dynamic grant) by DCI are repeatedly transmitted to a plurality of transmission and reception points. When, for example, repeating configured grant-based PUSCH transmission, a UE controls transmission of PUSCHs by using configured grant-based transmission configurations associated with different TRPs. The configured grant-based transmission configuration may be referred to as a CG configuration, a configured grant configuration, configured grant configuration, configured grant config, CG configuration or CG config.

Some types (a type 1 and a type 2) of configured grant-based transmission are supported. According to configured grant type 1 transmission (configured grant type 1 transmission or type 1 PUSCH transmission with configured grant), a parameter (that may be referred to as a configured grant-based transmission parameter or a configured grant parameter) used for configured grant-based transmission is configured to the UE by using only a higher layer signaling.

According to configured grant type 2 transmission (configured grant type 2 transmission or type 2 PUSCH transmission with configured grant), a configured grant parameter is configured to the UE by a higher layer signaling. According to configured grant type 2 transmission, at least part of the configured grant parameters may be notified to the UE by a physical layer signaling (e.g., activation Downlink Control Information (DCI)).

Furthermore, the configured grant-based transmission configuration (also referred to as a CG configuration below) includes parameters used for configured grant-based transmission. The configuration for configured grant-based transmission includes at least one of, for example, resource allocation, a periodicity and a repetition number (K) of a PUSCH used for configured grant-based transmission. Naturally, the parameters included in the CG configuration are not limited to these. A base station may notify the UE of the CG configuration by using a higher layer (e.g., RRC signaling).

The base station may configure a plurality of CG configurations to at least one of a given carrier and Bandwidth Part (BWP) for the UE. Furthermore, as for a plurality of configured CG configurations, the base station may instruct activation of one or a plurality of CG configurations of a plurality of configured CG configurations to the UE by using at least one of DCI and an MAC CE. The UE may control configured grant-based PUSCH transmission by using one or a plurality of CG configurations configured (or activated) by the base station.

The UE may repeatedly transmit the configured grant-based PUSCH by using a plurality of CGs. That is, the configured grant-based PUSCH is repeatedly transmitted by using a different CG configuration (CG PUSCH configuration) every given number of (e.g., one) repetitions.

One or more CG configuration configured to at least one of a given carrier and BWP may be associated with a given TRP. In this case, a TCI state of each configured grant-based PUSCH transmission may be configured to differ over repetitions. That is, the configured grant-based PUSCH repetitions are performed by using a plurality of CG configurations associated with different TRPs (or TCI states).

For example, the base station configures a plurality of CG configurations to at least one of a given carrier and BWP for the UE (see FIG. 7). This is a case where CG configurations #1 to #4 are configured (or activated) to the UE. Furthermore, there may be employed a configuration where at least part of parameters included in each CG configuration are different (or at least part of the parameters (e.g., periodicity) are the same).

The base station may configure how PUSCH repetition is performed over a plurality of CG configurations to the UE. For example, a CG configuration index (CG config ID) used for repetitions may be configured to the UE by, for example, a higher layer (RRC signaling). FIG. 7 illustrates a case where the CG configurations #1 to #4 are applied to given PUSCH repetitions.

The CG configurations #1 to #4 may be associated with respectively different TRPs (or TCI states). For example, there may be employed a configuration where the CG configuration #1 is associated with a TRP #1 (or a TCI state 1), the CG configuration #2 is associated with a TRP #2 (or a TCI state 2), the CG configuration #3 is associated with a TRP #3 (or a TCI state 3), and the CG configuration #4 is associated with a TRP #4 (or a TCI state 4).

Consequently, it is possible to repeatedly transmit PUSCHs by using the different CG configurations. Furthermore, by associating a different TCI state with each CG configuration, it is possible to transmit the repetitions of each PUSCH to different TRPs. In addition, the same CG configuration may be associated with the different TRPs.

Furthermore, respectively different PUSCH resources (that may be referred to as a PUSCH resource set) of each configured grant-based PUSCH repetition may be configured to the UE. For example, CG configurations respectively associated with a given number of repetitions may be configured to include respectively different PUSCH resources (CG PUSCH resources) (see FIG. 8).

Figure 8:
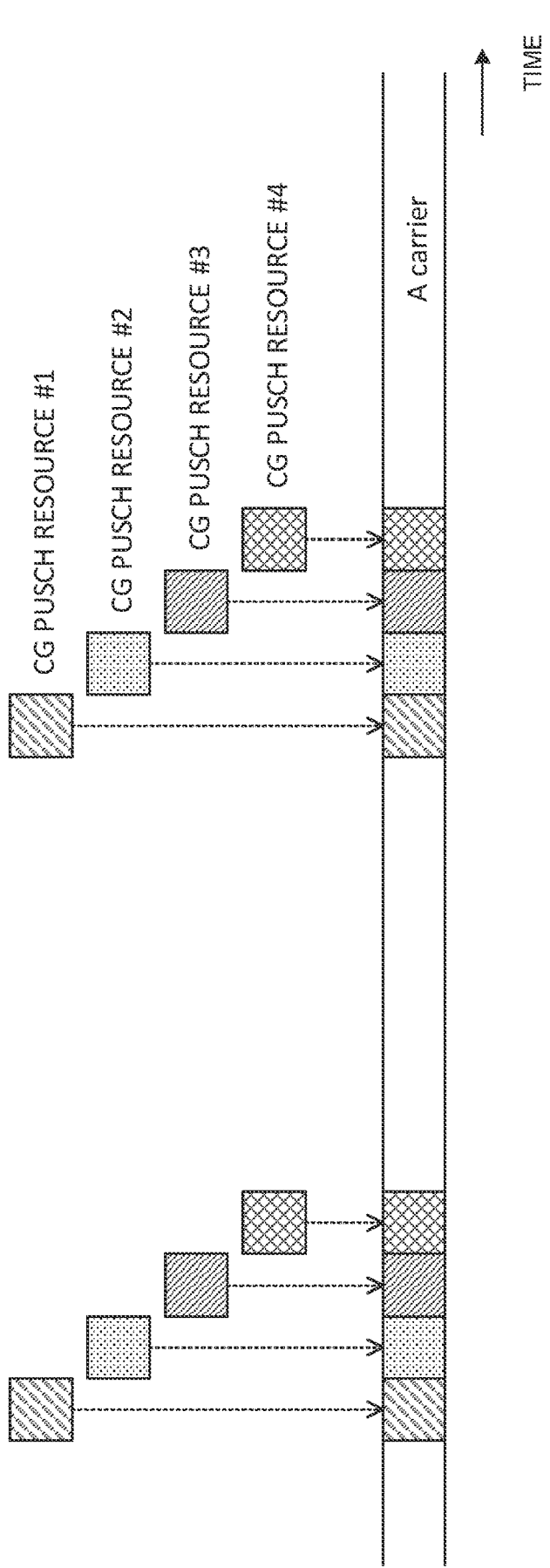
FIG. 8 is a diagram illustrating one example of PUSCH resources applied to configured grant-based PUSCH repetitions.

FIG. 8 illustrates a case where a plurality of PUSCH resources #1 to #4 are configured to a given carrier. Furthermore, the PUSCH resources #1 to #4 may be configured to be included in respectively different CG configurations (e.g., CG configurations #1 to #4). FIG. 8 illustrates a case where the PUSCH resources are configured in a time direction. However, a plurality of PUSCH resources may be arranged in a frequency direction as illustrated in FIG. 1B.

Furthermore, each PUSCH resource may be associated with a different TCI state. In this case, the UE can transmit PUSCHs to a plurality of TRPs by using the different PUSCH resources during repetitions. Consequently, it is possible to flexibly configure a PUSCH resource used for PUSCH transmission to each TRP. In addition, the same TCI state may be associated with part of the PUSCH resources.

Alternatively, there may be employed a configuration where configured grant-based PUSCH repetitions are performed by applying one CG configuration. When, for example, configured grant-based repetitions are performed by using a repetition factor K, K repetitions are performed by applying a given CG configuration.

The base station may configure a plurality of CG configurations to at least one of a given carrier and Bandwidth Part (BWP) for the UE. Furthermore, each CG configuration may be configured to include the repetition factor (K), and information related to a TCI state associated with each repetition of PUSCH repetitions (see FIG. 9).

FIG. 9 illustrates a case where the CG configuration #1 and the CG configuration #2 to be configured to the UE each include the repetition factor (K) and the information of the TCI state associated with each repetition. For example, FIG. 9 illustrates a case where, in the CG configuration #1, a TCI state of 1st repetitions is associated with a TCI index #1, a TCI state of 2nd repetitions is associated with a TCI index #2, a TCI state of 3rd repetitions is associated with a TCI index #3, and a TCI state of 4th repetitions is associated with a TCI index #4.

When performing repetitions by using the CG configuration #1, the UE performs transmission processing assuming a different TCI state for each repetition.

A repetition factor (repetition number) included in each CG configuration may be the same, or may be different. Furthermore, the base station may configure (or activate) a plurality of CG configurations to the UE. When, for example, the CG configuration #1 and the CG configuration #2 are configured (or activated) to the UE, the UE may respectively perform PUSCH repetitions that use the CG configuration #1 and PUSCH repetitions that use the CG configuration #2.

Thus, when a configured grant-based PUSCH is repeatedly transmitted, it is possible to perform PUSCH repetitions that use a plurality of CG configurations by configuring a plurality of CG configurations respectively associated with given TCI states to the UE.

—CSI Reporting—

The UE may piggyback a CSI reporting on at least one repetition during PUSCH repetitions (i.e., may multiplex the CSI reporting in at least one PUSCH). The UE may perform PUSCH repetitions based on the repetition number K.

The CSI reporting may be associated with a TRP. The UE may generate the CSI reporting associated with the TRP based on measurement of a downlink signal (a DL-RS, an SS block, a CSI-RS, a DL-RS associated with a transmission beam for a TRP and so on) transmitted from one TRP.

The CSI reporting may be one of a P-CSI reporting, an SP-CSI reporting and an A-CSI reporting. The CSI reporting may include at least one of a CSI part 1 and a CSI part 2.

The UE may transmit a CSI reporting during the PUSCH repetitions according to at least one of a following fifth aspect and sixth aspect. Each of the fifth aspect and the sixth aspect may be combined with at least one of the first aspect to the fourth aspect.

Fifth Aspect

A UE may transmit the same CSI reporting during at least two repetitions of K repetitions.

The UE may piggyback the same CSI reporting on each repetition of the K repetitions. In other words, during PUSCH repetitions, the UE may repeatedly transmit a TB, and repeatedly transmit a CSI reporting.

The UE may piggyback the same CSI reporting group (a group or a bundle) on a plurality of repetitions. The CSI reporting group may include a plurality of CSI reportings. A plurality of CSI reportings may be associated respectively with a plurality of TRPs. That is, a plurality of RSs may be respectively transmitted from a plurality of TRPs, and the UE may respectively generate a plurality of pieces of CSI based on a plurality of RSs.

The CSI reporting group may include CSI reportings associated with all TRPs of a plurality of TRPs associated with PUSCH repetitions, or may include CSI reportings associated with part of TRPs of a plurality of TRPs associated with the PUSCH repetitions.

The UE may piggyback the CSI reporting group on all repetitions of the K repetitions, or may piggyback the CSI reporting group on part of repetitions of the K repetitions.

The UE may rate-match UL data on repetition for piggybacking the CSI reporting. When piggybacking the same CSI reporting group on each repetition, the UE may perform rate-matching whose at least one of a rate matching pattern and a rate matching amount is the same on each repetition.

The rate matching pattern may be a resource set whose unit is Resource Blocks (RBs), symbols, Resource Elements (REs, subcarriers or symbols) and so on. At least one of the rate matching pattern and the rate matching amount may be configured (notified or provided) to the UE by a higher layer signaling. A list (a group or candidates) of at least ones of rate matching patterns and rate matching amounts may be configured to the UE by the higher layer signaling.

The UE may assume that a resource set indicated by the rate matching pattern cannot be used for UL data, and rate-match the UL data.

The UE may determine at least one of the rate matching pattern and the rate matching amount from the configured list based on a payload size (rate matching amount) of UCI (such as a CSI reporting or a CSI reporting group) piggybacked to the PUSCH.

A base station that has received PUSCH repetitions may decode items of UL data by selecting or synthesizing (soft-combining) a plurality of items of received UL data. Furthermore, the base station may decode CSI reportings by selecting or synthesizing (soft-combining) a plurality of received CSI reportings.

The UE may transmit a plurality of items of data generated from an same information bit sequence, and the base station may synthesize a plurality of items of data of an same HPN to soft-combine. The UE may include a buffer (soft buffer) that temporarily stores received data that has failed to be decoded. The base station may store the received data (e.g., a TB, a code block or a Code Block Group (CBG) including one or more code blocks) in a soft buffer.

When the UE rate-matches a PUSCH of each repetition by using the same rate matching pattern and the same rate matching amount, the base station can easily synthesize items of UL data in a plurality of PUSCHs. Consequently, it is possible to enhance reception performance of UL data, and suppress a load of synthesis of the UL data.

When the UE piggybacks the same CSI reporting to each PUSCH during PUSCH repetitions, the base station can easily synthesize CSI reportings in a plurality of PUSCHs. Consequently, it is possible to enhance reception performance of the CSI reporting.

When the UE piggybacks the same CSI reporting group to each PUSCH during PUSCH repetitions, the base station can enhance reception performance of a plurality of CSI reportings included in a CSI reporting group.

The UE may not transmit the UL data during each repetition (PUSCH without UL-SCH), and transmit the CSI reporting during at least one repetition (UCI on PUSCH without UL-SCH).

Figure 10:
FIG. 10 is a diagram illustrating one example of a CSI reporting.

FIG. 10 is a diagram illustrating one example of a CSI reporting.

CSI reportings of CSI #1 to #4 are configured to the UE. The CSI #1 to #4 are based on TRPs #1 to #4, respectively. The UE measures an RS associated with the TRP #1 (an RS transmitted from the TRP #1), and generates the CSI #1 for the TRP #1. The UE measures an RS associated with the TRP #2 (an RS transmitted from the TRP #2), and generates the CSI #2 for the TRP #2. The UE measures an RS associated with the TRP #3 (an RS transmitted from the TRP #3), and generates the CSI #3 for the TRP #3. The UE measures an RS associated with the TRP #4 (an RS transmitted from the TRP #4), and generates the CSI #4 for the TRP #4. Payload sizes of the CSI #1 to #4 may be the same, or may be different.

Furthermore, the UE generates a CSI reporting group including the CSI #1 to #4. Part of the CSI reportings of the CSI #1 to #4 may be configured to the UE. The CSI reporting group may include part of the CSI #1 to #4.

PUSCH repetitions including PUSCHs #1 to #4 are scheduled for the UE. The PUSCHs #1 to #4 may be scheduled to resources whose at least one of a time and a frequency is different for the UE.

The PUSCHs #1 to #4 may be associated with the TRPs #1 to #4, respectively. More specifically, the UE transmits the PUSCH #1 by using a transmission beam (at least one of QCL, a TCI state and spatial relation information) associated with the TRP #1. The UE transmits the PUSCH #2 by using a transmission beam (at least one of QCL, a TCI state and spatial relation information) associated with the TRP #2. The UE transmits the PUSCH #3 by using a transmission beam (at least one of QCL, a TCI state and spatial relation information) associated with the TRP #3. The UE transmits the PUSCH #4 by using a transmission beam (at least one of QCL, a TCI state and spatial relation information) associated with the TRP #4.

UL data of each of the PUSCHs #1 to #4 may be based on the same TB. The UL data of each of the PUSCHs #1 to #4 may include a different RV.

The UE may determine at least one of a rate matching pattern and a rate matching amount based on the payload size of the CSI reporting group. The UE may rate-match the UL data of each of the PUSCHs #1 to #4 by using the same rate matching pattern and the same rate matching amount.

The UE piggybacks the same CSI reporting group to each of the PUSCHs #1 to #4.

The base station decodes the CSI reporting group by selecting or synthesizing the CSI reporting groups of the PUSCHs #1 to #4. The base station decodes the TB by selecting or synthesizing the items of rate-matched UL data of the PUSCHs #1 to #4.

Sixth Aspect

A UE may transmit CSI reportings including different pieces of information during at least two repetitions of K repetitions.

The UE may piggyback the CSI reportings including the different pieces of information on each repetition of the K repetitions. In other words, the UE may repeatedly transmits a TB, and may not repeatedly transmit a CSI reporting during PUSCH repetitions.

The UE may piggyback each of a plurality of different CSI reportings on a plurality of repetitions. A plurality of CSI reportings may be associated respectively with a plurality of TRPs. That is, a plurality of TRPs respectively transmit a plurality of RSs, and the UE may respectively generate a plurality of pieces of CSI based on a plurality of RSs.

The UE may generate CSI reportings associated with all TRPs of a plurality of TRPs associated with PUSCH repetitions, or may generate CSI reportings associated with part of TRPs of a plurality of TRPs associated with the PUSCH repetitions.

The UE may piggyback corresponding CSI reportings on all repetitions of the K repetitions, or may piggyback the corresponding CSI reportings on part of repetitions of the K repetitions.

The UE may rate-match UL data on repetition to piggyback the CSI reportings.

There is a case where payload sizes of a plurality of CSI reportings are different from each other. In this case, when the UE performs rate-matching for a plurality of repetitions by using different rate matching patterns and different rate matching amounts, a load to decode UL data becomes high or it is difficult to decode the UL data in a base station. More specifically, a processing amount for synthesizing the UL data between repetitions and performing error correction decoding increases.

The UE may use the same rate matching pattern and the same rate matching amount (a resource amount reduced by rate matching) for rate-matching of each repetition.

The UE may determine at least one of the rate matching pattern and the rate matching amount based on a maximum payload size of a plurality of CSI reportings associated with a plurality of TRPs. When the base station knows a payload size of each CSI reporting in advance, or when the base station configures the payload size of each CSI reporting to the UE, the base station may determine at least one of the rate matching pattern and the rate matching amount based on the maximum payload size.

The UE may determine at least one of the rate matching pattern and the rate matching amount based on the maximum payload size of a plurality of candidates (values that can be taken) of payload sizes of CSI reportings. When the base station does not know a payload size of each CSI reporting, or when the base station does not configure the payload size of each CSI reporting to the UE, the base station may determine at least one of the rate matching pattern and the rate matching amount based on the maximum payload size. A plurality of candidates of the payload sizes of the CSI reportings may be specified in a specification. The UE may be configured with a plurality of candidates of the payload sizes of the CSI reportings (by, for example, a higher layer signaling). The UE may be configured with the maximum payload size of the CSI reporting (by, for example, a higher layer signaling).

In addition, when determining at least one of the rate matching pattern and the rate matching amount, the UE may take into account a modulation scheme (or a Modulation and Coding Scheme (MCS)) to be applied to data and CSI, the number of resource blocks or the number of symbols allocated to a PUSCH, and a β offset value to be applied to transmission of the PUSCH in addition to the payload sizes of the CSI reportings.

When the UE determines at least one of the rate matching pattern and the rate matching amount based on the maximum payload size among a plurality of candidates of the payload sizes of the CSI reportings, the base station can appropriately decode a rate-matched PUSCH even when the base station does not know the payload size of each CSI reporting.

When the UE rate-matches a PUSCH of each repetition by using the same rate matching pattern and the same rate matching amount, the base station can easily synthesize items of UL data in a plurality of PUSCHs. Consequently, it is possible to enhance reception performance of the UL data, and suppress a load of synthesis of the UL data.

The UE may not transmit UL data during each repetition (PUSCH without UL-SCH), and may transmit a CSI reporting during at least one repetition (UCI on PUSCH without UL-SCH).

Figure 11:
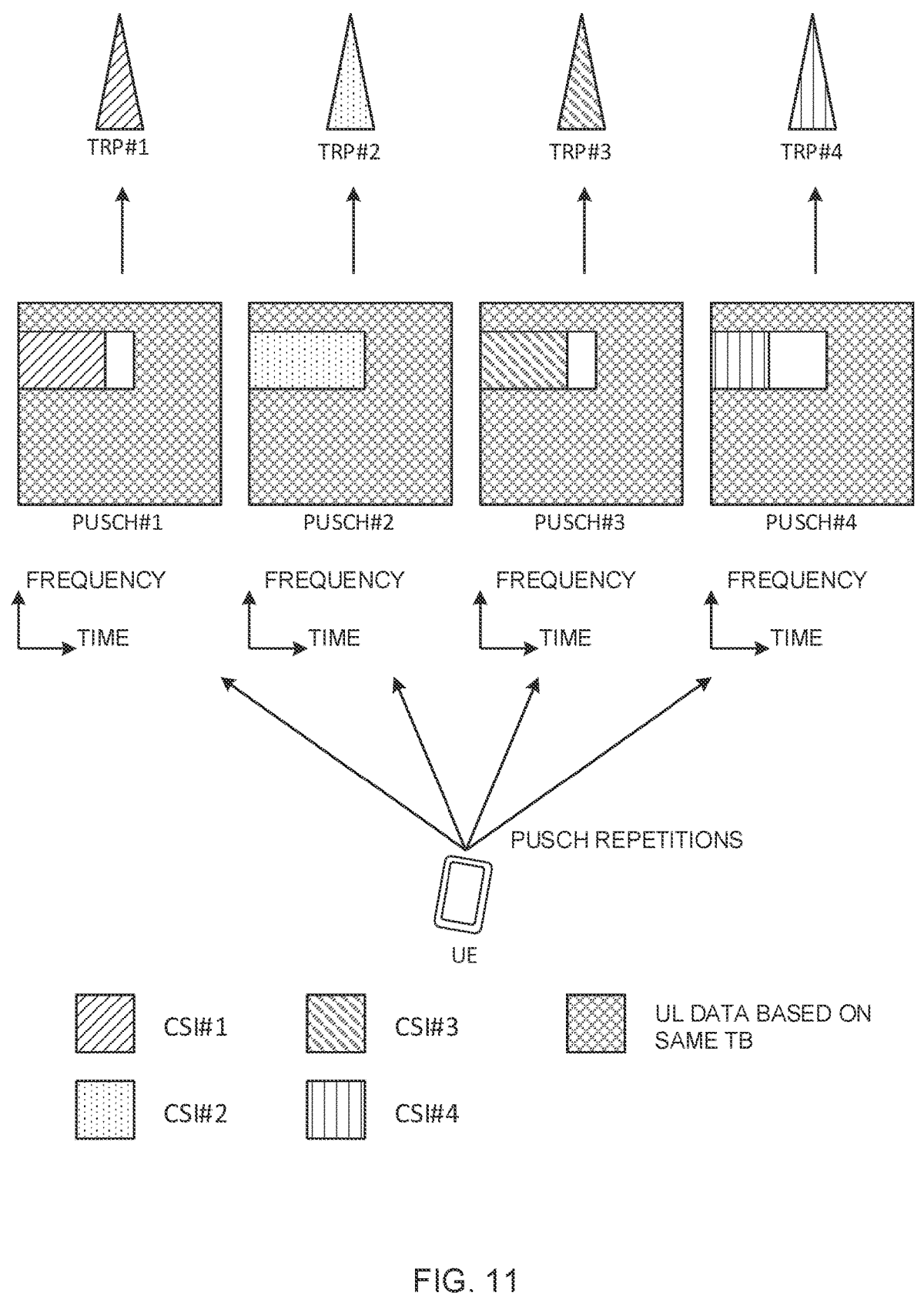

FIG. 11 is a diagram illustrating one example of a CSI reporting.

The UE generates CSI reportings #1 to #4 associated with TRPs #1 to #4, respectively, similar to FIG. 10. The UE transmits PUSCHs #1 to #4 associated with the TRPs #1 to #4, respectively, similar to FIG. 10.

Respective items of UL data of the PUSCHs #1 to #4 may be based on the same TB. The respective items of UL data of the PUSCHs #1 to #4 may include different RVs.

The UE may determine at least one of a rate matching pattern and a rate matching amount based on a maximum payload size of CSI #1 to #4. In an example in this FIG. 11, the CSI #2 has the maximum payload size, and therefore the UE determines at least one of the rate matching pattern and the rate matching amount based on the payload size of the CSI #2. The UE may rate-match the respective items of UL data of the PUSCHs #1 to #4 by using the same rate matching pattern and rate matching amount.

The UE piggybacks CSI on a corresponding PUSCH. That is, the UE piggybacks the CSI #1 to #4 on the PUSCHs #1 to #4, respectively.

The base station decodes the CSI #1 to #4 from the PUSCHs #1 to #4, respectively. The base station decodes a TB by selecting or synthesizing the items of rate-matched UL data of the PUSCHs #1 to #4.

The CSI reporting according to the above fifth aspect and sixth aspect is applicable likewise to a CSI reporting that uses a PUSCH that does not include data (UCI on PUSCH without UL-SCH), too. In a case of a CSI reporting that uses the PUSCH that does not include data, the UL data is not just multiplexed on the PUSCH, and other processing such as resource allocation, determination of the number of times of repetitions, a method for determining CSI reporting information or a payload size and determination of a TCI state SRI of each repetition can be performed similar to the first to fourth aspects.

When the sixth aspect is applied to a CSI reporting that uses a PUSCH that does not include data, the UE does not need to apply the same rate matching pattern and rate matching amount over a plurality of repetitions.

(Radio Communication System)

The configuration of the radio communication system according to one embodiment of the present invention will be described below. This radio communication system uses one or a combination of the radio communication method according to the above embodiment/aspect of the present invention to perform communication.

Figure 12:
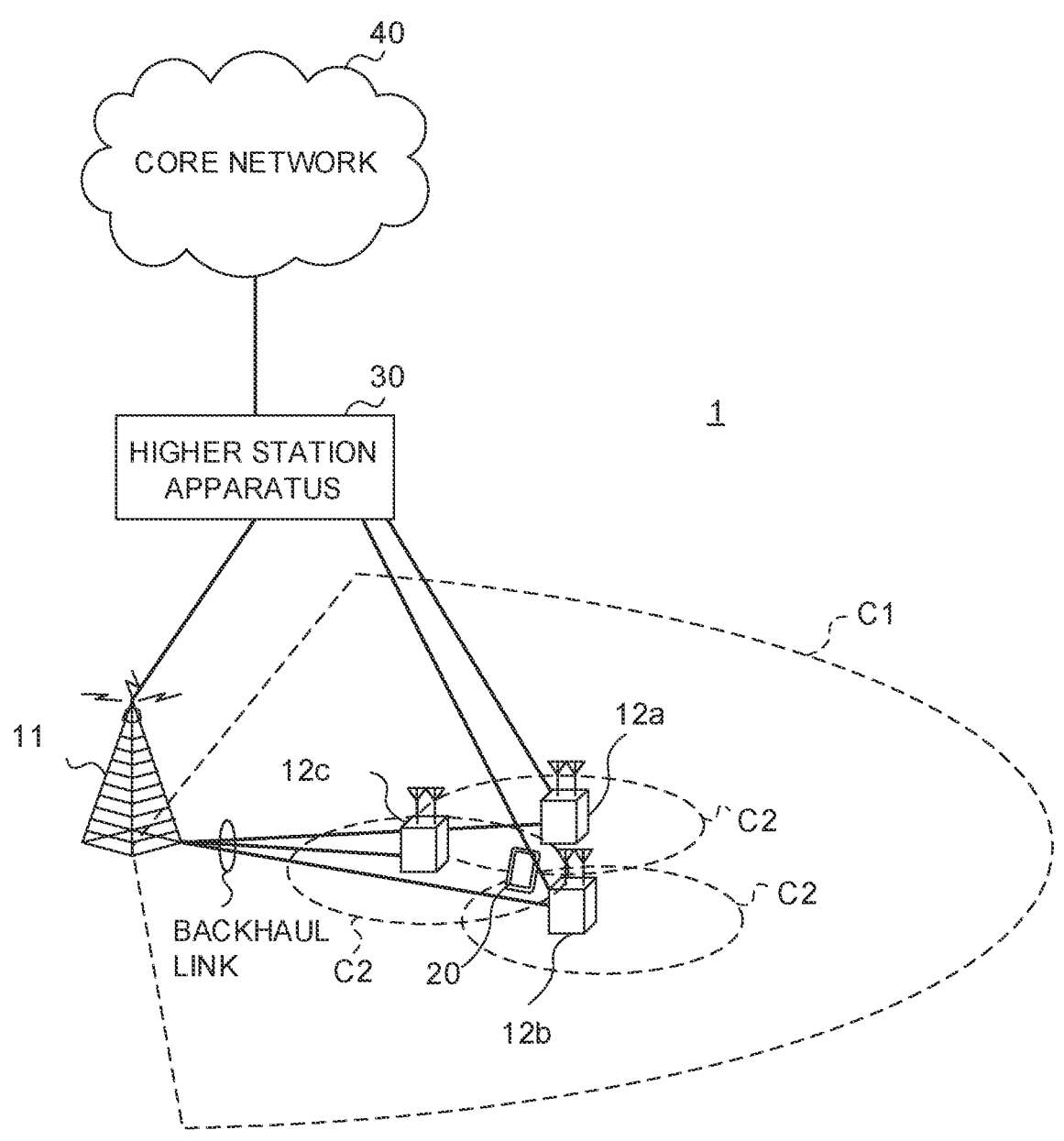
FIG. 12 is a diagram illustrating one example of a schematic configuration of a radio communication system according to the present embodiment.

FIG. 12 is a diagram illustrating one example of a schematic configuration of the radio communication system according to the one embodiment of the present invention. A radio communication system 1 can apply Carrier Aggregation (CA) and/or Dual Connectivity (DC) that aggregate a plurality of base frequency blocks (component carriers) whose 1 unit is a system bandwidth (e.g., 20 MHz) of the LTE system.

In this regard, the radio communication system 1 may be referred to as Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), New Radio (NR), Future Radio Access (FRA) and the New Radio Access Technology (New-RAT), or a system that realizes these techniques.

The radio communication system 1 includes a base station 11 that forms a macro cell C1 of a relatively wide coverage, and base stations 12 (12a to 12c) that are located in the macro cell C1 and form small cells C2 narrower than the macro cell C1. Furthermore, a user terminal 20 is located in the macro cell C1 and each small cell C2. An arrangement and the numbers of respective cells and the user terminals 20 are not limited to the aspect illustrated in FIG. 12.

The user terminal 20 can connect with both of the base station 11 and the base stations 12. The user terminal 20 is assumed to concurrently use the macro cell C1 and the small cells C2 by CA or DC. Furthermore, the user terminal 20 can apply CA or DC by using a plurality of cells (CCs) (e.g., five CCs or less or six CCs or more).

The user terminal 20 and the base station 11 can communicate by using a carrier (also referred to as a legacy carrier) of a narrow bandwidth in a relatively low frequency band (e.g., 2 GHz). On the other hand, the user terminal 20 and each base station 12 may use a carrier of a wide bandwidth in a relatively high frequency band (e.g., 3.5 GHz or 5 GHz) or may use the same carrier as that used between the user terminal 20 and the base station 11. In this regard, a configuration of the frequency band used by each base station is not limited to this.

The base station 11 and each base station 12 (or the two base stations 12) may be connected by way of wired connection (e.g., optical fibers compliant with a Common Public Radio Interface (CPRI) or an X2 interface) or radio connection.

The base station 11 and each base station 12 are each connected with a higher station apparatus 30 and connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Furthermore, each base station 12 may be connected with the higher station apparatus 30 via the base station 11.

In this regard, the base station 11 is a base station that has a relatively wide coverage, and may be referred to as a macro base station, an aggregate node, an eNodeB (eNB) or a transmission and reception point. Furthermore, each base station 12 is a base station that has a local coverage, and may be referred to as a small base station, a micro base station, a pico base station, a femto base station, a Home eNodeB (HeNB), a Remote Radio Head (RRH) or a transmission and reception point. The base stations 11 and 12 will be collectively referred to as a base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and applies Single Carrier-Frequency Division Multiple Access (SC-FDMA) and/or OFDMA to uplink as radio access schemes.

OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into bands including one or contiguous resource blocks per terminal and causes a plurality of terminals to use respectively different bands to reduce an inter-terminal interference. In this regard, uplink and downlink radio access schemes are not limited to a combination of these schemes, and other radio access schemes may be used.

The radio communication system 1 uses a downlink shared channel (PDSCH: Physical Downlink Shared Channel) shared by each user terminal 20, a broadcast channel (PBCH: Physical Broadcast Channel) and a downlink L1/L2 control channel as downlink channels. User data, higher layer control information and a System Information Block (SIB) are transmitted on the PDSCH. Furthermore, a Master Information Block (MIB) is transmitted on the PBCH.

The downlink L1/L2 control channel includes a Physical Downlink Control Channel (PDCCH), an Enhanced Physical Downlink Control Channel (EPDCCH), a Physical Control Format Indicator Channel (PCFICH), and a Physical Hybrid-ARQ Indicator Channel (PHICH). Downlink Control Information (DCI) including scheduling information of the PDSCH and/or the PUSCH is transmitted on the PDCCH.

In addition, the scheduling information may be notified by the DCI. For example, DCI for scheduling DL data reception may be referred to as a DL assignment, and DCI for scheduling UL data transmission may be referred to as a UL grant.

The number of OFDM symbols used for the PDCCH is transmitted on the PCFICH. Transmission acknowledgement information (also referred to as, for example, retransmission control information, HARQ-ACK or ACK/NACK) of a Hybrid Automatic Repeat reQuest (HARQ) for the PUSCH is transmitted on the PHICH. The EPDCCH is subjected to frequency division multiplexing with the PDSCH (downlink shared data channel) and is used to convey DCI similar to the PDCCH.

The radio communication system 1 uses an uplink shared channel (PUSCH: Physical Uplink Shared Channel) shared by each user terminal 20, an uplink control channel (PUCCH: Physical Uplink Control Channel), and a random access channel (PRACH: Physical Random Access Channel) as uplink channels. User data and higher layer control information are transmitted on the PUSCH. Furthermore, downlink radio quality information (CQI: Channel Quality Indicator), transmission acknowledgement information and a Scheduling Request (SR) are transmitted on the PUCCH. A random access preamble for establishing connection with a cell is transmitted on the PRACH.

The radio communication system 1 conveys a Cell-specific Reference Signal (CRS), a Channel State Information-Reference Signal (CSI-RS), a DeModulation Reference Signal (DMRS) and a Positioning Reference Signal (PRS) as downlink reference signals. Furthermore, the radio communication system 1 conveys a Sounding Reference Signal (SRS) and a DeModulation Reference Signal (DMRS) as uplink reference signals. In this regard, the DMRS may be referred to as a user terminal-specific reference signal (UE-specific reference signal). Furthermore, a reference signal to be transmitted is not limited to these.

<Base Station>

Figure 13:
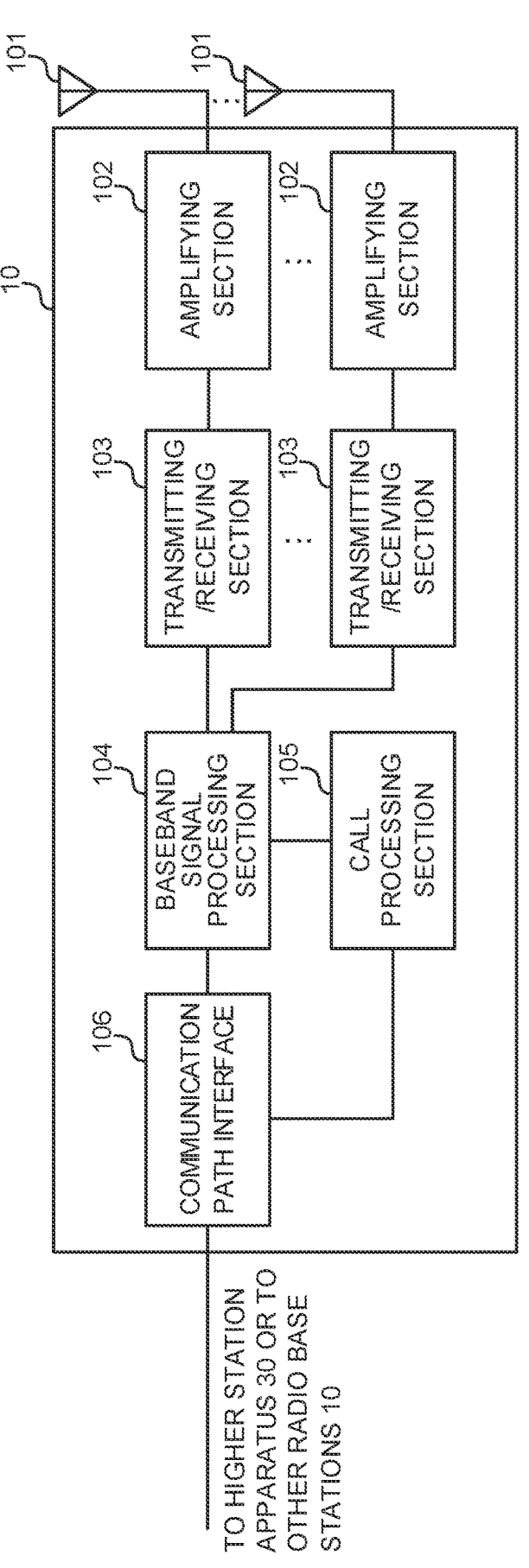
FIG. 13 is a diagram illustrating one example of an overall configuration of a base station according to the present embodiment.

FIG. 13 is a diagram illustrating one example of an overall configuration of the base station according to the one embodiment of the present invention. The base station 10 includes pluralities of transmission/reception antennas 101, amplifying sections 102 and transmitting/receiving sections 103, a baseband signal processing section 104, a call processing section 105 and a communication path interface 106. In this regard, the base station 10 only needs to be configured to include one or more of each of the transmission/reception antennas 101, the amplifying sections 102 and the transmitting/receiving sections 103.

User data transmitted from the base station 10 to the user terminal 20 on downlink is input from the higher station apparatus 30 to the baseband signal processing section 104 via the communication path interface 106.

The baseband signal processing section 104 performs processing of a Packet Data Convergence Protocol (PDCP) layer, segmentation and concatenation of the user data, transmission processing of a Radio Link Control (RLC) layer such as RLC retransmission control, Medium Access Control (MAC) retransmission control (e.g., HARQ transmission processing), and transmission processing such as scheduling, transmission format selection, channel coding, Inverse Fast Fourier Transform (IFFT) processing, and precoding processing on the user data, and transfers the user data to each transmitting/receiving section 103. Furthermore, the baseband signal processing section 104 performs transmission processing such as channel coding and inverse fast Fourier transform on a downlink control signal, too, and transfers the downlink control signal to each transmitting/receiving section 103.

Each transmitting/receiving section 103 converts a baseband signal precoded and output per antenna from the baseband signal processing section 104 into a radio frequency range, and transmits a radio frequency signal. The radio frequency signal subjected to frequency conversion by each transmitting/receiving section 103 is amplified by each amplifying section 102, and is transmitted from each transmission/reception antenna 101. The transmitting/receiving sections 103 can be composed of transmitters/receivers, transmission/reception circuits or transmission/reception apparatuses described based on a common knowledge in a technical field according to the present invention. In this regard, the transmitting/receiving sections 103 may be composed as an integrated transmitting/receiving section or may be composed of transmitting sections and receiving sections.

Meanwhile, each amplifying section 102 amplifies a radio frequency signal received by each transmission/reception antenna 101 as an uplink signal. Each transmitting/receiving section 103 receives the uplink signal amplified by each amplifying section 102. Each transmitting/receiving section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, MAC retransmission control reception processing, and reception processing of an RLC layer and a PDCP layer on user data included in the input uplink signal, and transfers the user data to the higher station apparatus 30 via the communication path interface 106. The call processing section 105 performs call processing (such as configuration and release) of a communication channel, state management of the base station 10 and radio resource management.

The communication path interface 106 transmits and receives signals to and from the higher station apparatus 30 via a given interface. Furthermore, the communication path interface 106 may transmit and receive (backhaul signaling) signals to and from the another base station 10 via an inter-base station interface (e.g., optical fibers compliant with the Common Public Radio Interface (CPRI) or the X2 interface).

Furthermore, each transmitting/receiving section 103 receives a PUSCH repeatedly transmitted from the user terminal 20. Furthermore, each transmitting/receiving section 103 may transmit information related to at least one of quasi-co-location, a Transmission Configuration Indication (TCI) state, a Sounding reference signal Resource Indicator (SRI) and spatial relation information associated with repetition or a redundancy version of the PUSCH.

Figure 14:
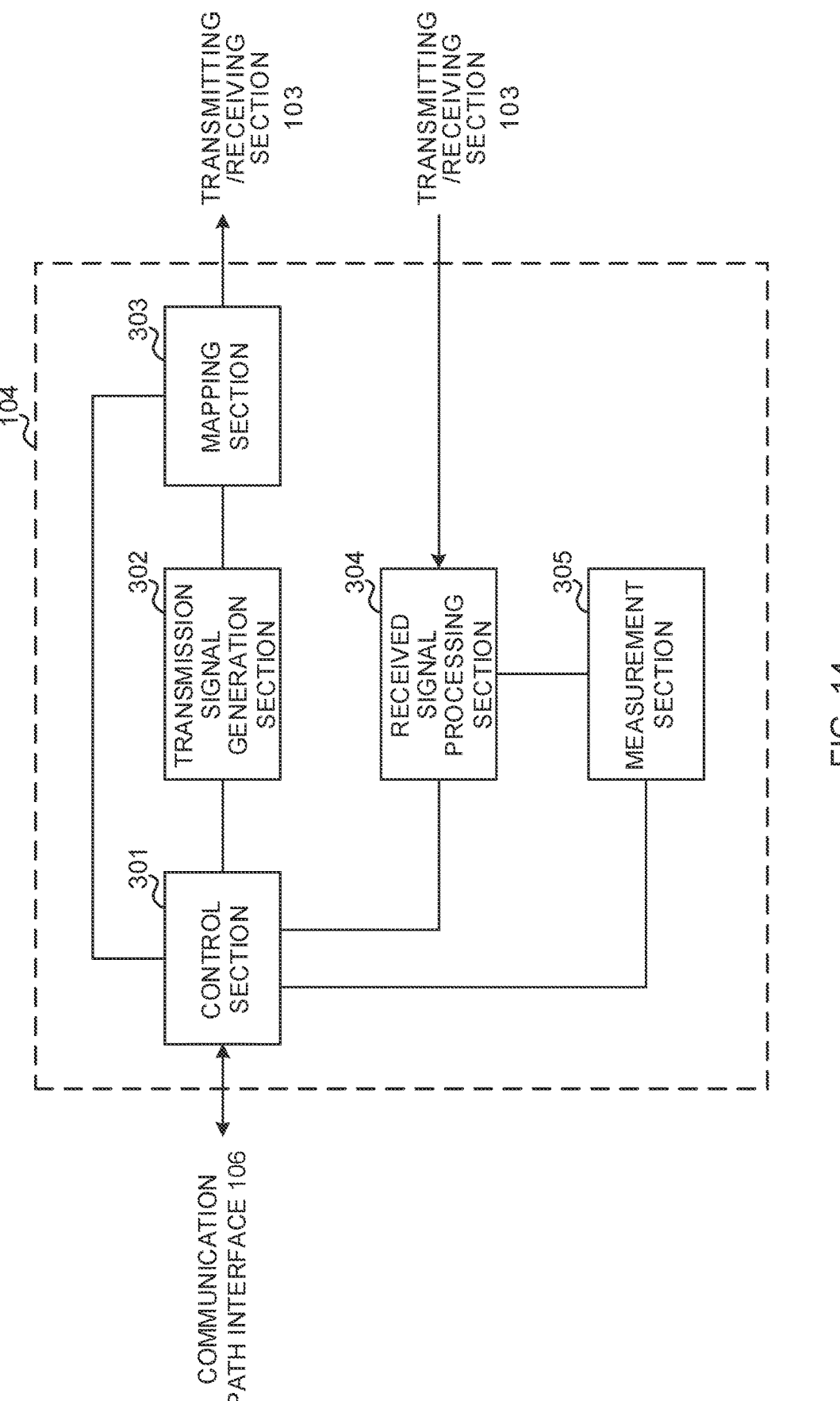
FIG. 14 is a diagram illustrating one example of a function configuration of the base station according to the present embodiment.

FIG. 14 is a diagram illustrating one example of a function configuration of the base station according to the one embodiment of the present invention. In addition, this example mainly illustrates function blocks of characteristic portions according to the present embodiment, and assumes that the base station 10 includes other function blocks, too, that are necessary for radio communication.

The baseband signal processing section 104 includes at least the control section (scheduler) 301, a transmission signal generation section 302, a mapping section 303, a received signal processing section 304 and a measurement section 305. In addition, these components only need to be included in the base station 10, and part or all of the components may not be included in the baseband signal processing section 104.

The control section (scheduler) 301 controls the entire base station 10. The control section 301 can be composed of a controller, a control circuit or a control apparatus described based on the common knowledge in the technical field according to the present invention.

The control section 301 controls, for example, signal generation of the transmission signal generation section 302 and signal allocation of the mapping section 303. Furthermore, the control section 301 controls signal reception processing of the received signal processing section 304 and signal measurement of the measurement section 305.

The control section 301 controls scheduling (e.g., resource allocation) of system information, a downlink data signal (e.g., a signal that is transmitted on the PDSCH), and a downlink control signal (e.g., a signal that is transmitted on the PDCCH and/or the EPDCCH and is, for example, transmission acknowledgement information). Furthermore, the control section 301 controls generation of a downlink control signal and a downlink data signal based on a result obtained by deciding whether or not it is necessary to perform retransmission control on an uplink data signal. Furthermore, the control section 301 controls scheduling of synchronization signals (e.g., a Primary Synchronization Signal (PSS)/a Secondary Synchronization Signal (SSS)) and downlink reference signals (e.g., a CRS, a CSI-RS and a DMRS).

The transmission signal generation section 302 generates a downlink signal (such as a downlink control signal, a downlink data signal or a downlink reference signal) based on an instruction from the control section 301, and outputs the downlink signal to the mapping section 303. The transmission signal generation section 302 can be composed of a signal generator, a signal generating circuit or a signal generating apparatus described based on the common knowledge in the technical field according to the present invention.

The transmission signal generation section 302 generates, for example, a DL assignment for giving notification of downlink data allocation information, and/or a UL grant for giving notification of uplink data allocation information based on the instruction from the control section 301. The DL assignment and the UL grant are both DCI, and conform to a DCI format. Furthermore, the transmission signal generation section 302 performs encoding processing and modulation processing on the downlink data signal according to a code rate and a modulation scheme determined based on Channel State Information (CSI) from each user terminal 20.

The mapping section 303 maps the downlink signal generated by the transmission signal generation section 302, on given radio resources based on the instruction from the control section 301, and outputs the downlink signal to each transmitting/receiving section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmitting/receiving section 103. In this regard, the received signal is, for example, an uplink signal (such as an uplink control signal, an uplink data signal or an uplink reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. When, for example, receiving the PUCCH including HARQ-ACK, the received signal processing section 304 outputs the HARQ-ACK to the control section 301. Furthermore, the received signal processing section 304 outputs the received signal and/or the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

For example, the measurement section 305 may perform Radio Resource Management (RRM) measurement or Channel State Information (CSI) measurement based on the received signal. The measurement section 305 may measure received power (e.g., Reference Signal Received Power (RSRP)), received quality (e.g., Reference Signal Received Quality (RSRQ) or a Signal to Interference plus Noise Ratio (SINR)), a signal strength (e.g., a Received Signal Strength Indicator (RSSI)) or channel information (e.g., CSI). The measurement section 305 may output a measurement result to the control section 301.

Furthermore, the control section 301 controls scheduling of an uplink data signal (e.g., a signal that is transmitted on the PUSCH), an uplink control signal (e.g., a signal that is transmitted on the PUCCH and/or the PUSCH and is, for example, transmission acknowledgement information), a random access preamble (e.g., a signal that is transmitted on the PRACH) and an uplink reference signal.

Furthermore, the control section 301 may configure at least one of the quasi-co-location, the Transmission Configuration Indication (TCI) state, the Sounding reference signal Resource Indicator (SRI) and the spatial relation information to the repetition or the redundancy version of the PUSCH transmitted by the user terminal 20.

<User Terminal>

Figure 15:
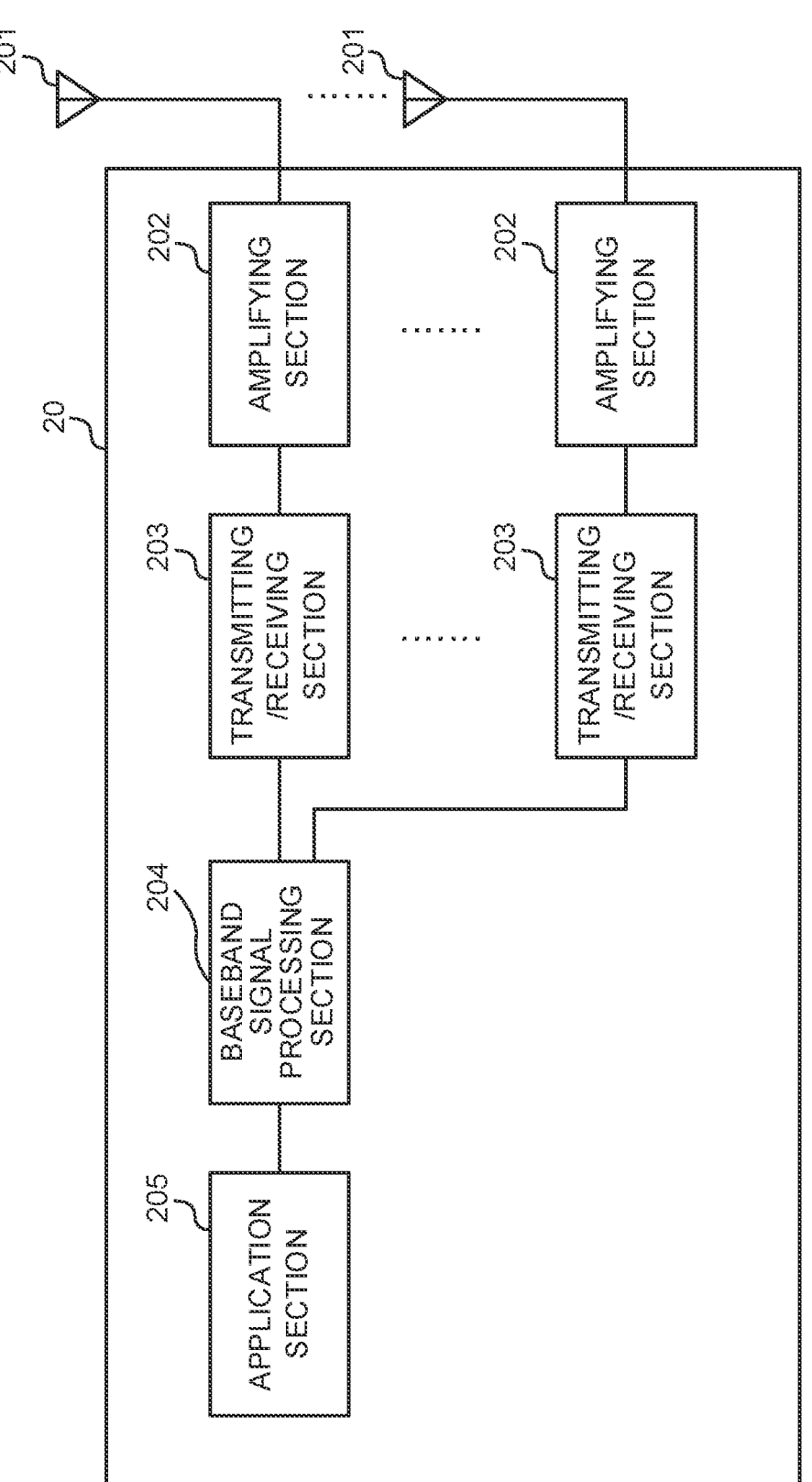
FIG. 15 is a diagram illustrating one example of an overall configuration of a user terminal according to the present embodiment.

FIG. 15 is a diagram illustrating one example of an overall configuration of the user terminal according to the one embodiment of the present invention. The user terminal 20 includes pluralities of transmission/reception antennas 201, amplifying sections 202 and transmitting/receiving sections 203, a baseband signal processing section 204 and an application section 205. In this regard, the user terminal 20 only needs to be configured to include one or more of each of the transmission/reception antennas 201, the amplifying sections 202 and the transmitting/receiving sections 203.

Each amplifying section 202 amplifies a radio frequency signal received at each transmission/reception antenna 201. Each transmitting/receiving section 203 receives a downlink signal amplified by each amplifying section 202. Each transmitting/receiving section 203 performs frequency conversion on the received signal into a baseband signal, and outputs the baseband signal to the baseband signal processing section 204. The transmitting/receiving sections 203 can be composed of transmitters/receivers, transmission/reception circuits or transmission/reception apparatuses described based on the common knowledge in the technical field according to the present invention. In this regard, the transmitting/receiving sections 203 may be composed as an integrated transmitting/receiving section or may be composed of transmitting sections and receiving sections.

The baseband signal processing section 204 performs FFT processing, error correcting decoding and retransmission control reception processing on the input baseband signal. The baseband signal processing section 204 transfers downlink user data to the application section 205. The application section 205 performs processing related to layers higher than a physical layer and an MAC layer. Furthermore, the baseband signal processing section 204 may transfer broadcast information of the downlink data, too, to the application section 205.

On the other hand, the application section 205 inputs uplink user data to the baseband signal processing section 204. The baseband signal processing section 204 performs retransmission control transmission processing (e.g., HARQ transmission processing), channel coding, precoding, Discrete Fourier Transform (DFT) processing and IFFT processing on the uplink user data, and transfers the uplink user data to each transmitting/receiving section 203. Each transmitting/receiving section 203 converts the baseband signal output from the baseband signal processing section 204 into a radio frequency range, and transmits a radio frequency signal. The radio frequency signal subjected to the frequency conversion by each transmitting/receiving section 203 is amplified by each amplifying section 202, and is transmitted from each transmission/reception antenna 201.

Furthermore, each transmitting/receiving section 203 transmits an uplink shared channel to one or more transmission and reception points every given number of repetitions. Furthermore, each transmitting/receiving section 203 may receive the information related to at least one of the quasi-co-location, the Transmission Configuration Indication (TCI) state, the Sounding reference signal Resource Indicator (SRI) and the spatial relation information associated with the repetition or the redundancy version of the PUSCH.

Furthermore, each transmitting/receiving section 203 may transmit a plurality of uplink shared channels (PUSCH repetitions) associated with a plurality of transmission and reception points.

Figure 16:
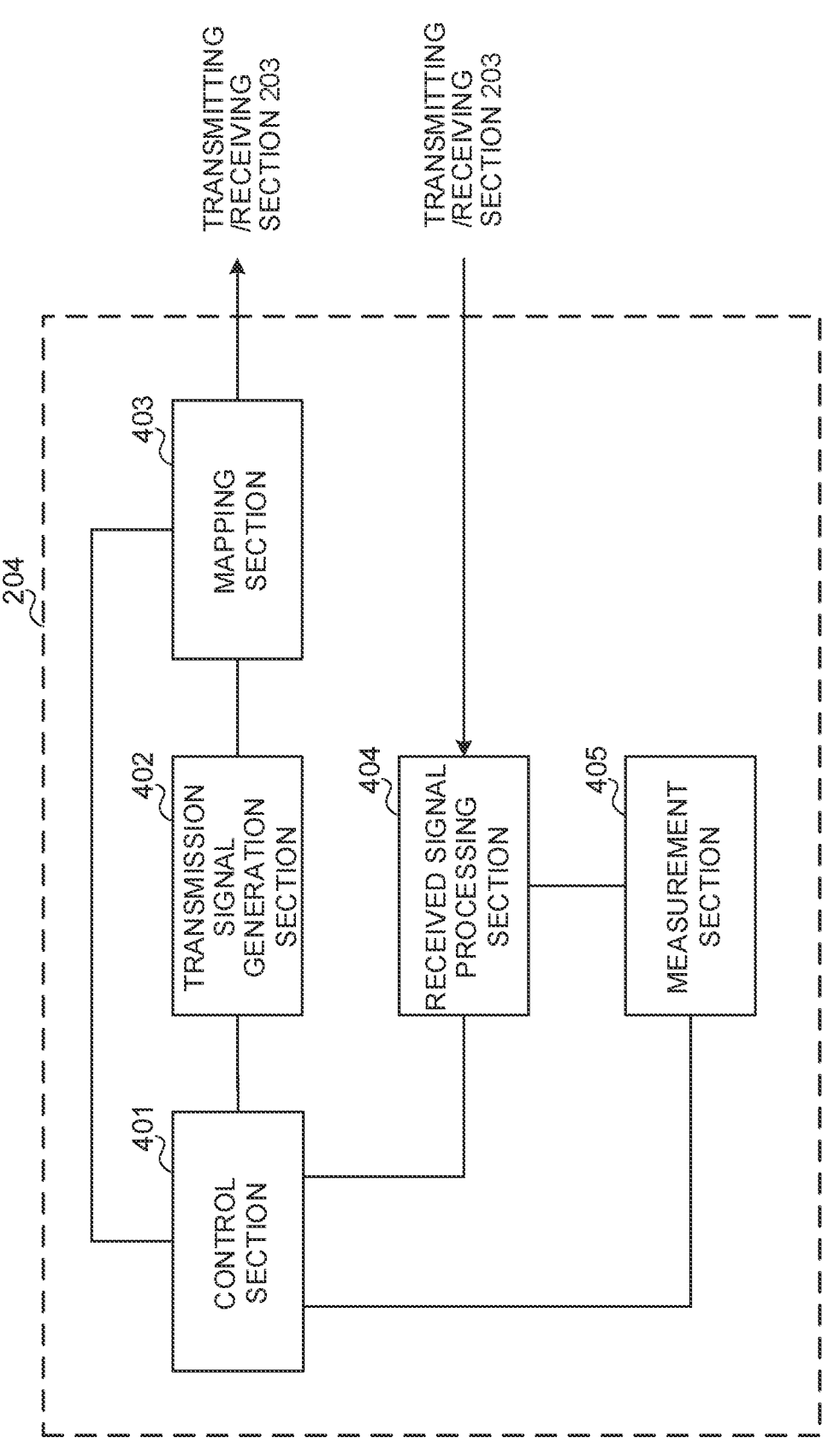
FIG. 16 is a diagram illustrating one example of a function configuration of the user terminal according to the present embodiment.

FIG. 16 is a diagram illustrating one example of a function configuration of the user terminal according to the one embodiment of the present invention. In addition, this example mainly illustrates function blocks of characteristic portions according to the present embodiment, and assumes that the user terminal 20 includes other function blocks, too, that are necessary for radio communication.

The baseband signal processing section 204 of the user terminal 20 includes at least a control section 401, a transmission signal generation section 402, a mapping section 403, a received signal processing section 404 and a measurement section 405. In addition, these components only need to be included in the user terminal 20, and part or all of the components may not be included in the baseband signal processing section 204.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generation section 402 and signal allocation of the mapping section 403. Furthermore, the control section 401 controls signal reception processing of the received signal processing section 404 and signal measurement of the measurement section 405.

The control section 401 obtains from the received signal processing section 404 a downlink control signal and a downlink data signal transmitted from the base station 10.

The control section 401 controls generation of an uplink control signal and/or an uplink data signal based on a result obtained by deciding whether or not it is necessary to perform retransmission control on the downlink control signal and/or the downlink data signal.

The transmission signal generation section 402 generates an uplink signal (such as an uplink control signal, an uplink data signal or an uplink reference signal) based on an instruction from the control section 401, and outputs the uplink signal to the mapping section 403. The transmission signal generation section 402 can be composed of a signal generator, a signal generating circuit or a signal generating apparatus described based on the common knowledge in the technical field according to the present invention.

The transmission signal generation section 402 generates, for example, an uplink control signal related to transmission acknowledgement information and Channel State Information (CSI) based on the instruction from the control section 401. Furthermore, the transmission signal generation section 402 generates an uplink data signal based on the instruction from the control section 401. When, for example, the downlink control signal notified from the base station 10 includes a UL grant, the transmission signal generation section 402 is instructed by the control section 401 to generate an uplink data signal.

The mapping section 403 maps the uplink signal generated by the transmission signal generation section 402, on radio resources based on the instruction from the control section 401, and outputs the uplink signal to each transmitting/receiving section 203. The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmitting/receiving section 203. In this regard, the received signal is, for example, a downlink signal (such as a downlink control signal, a downlink data signal or a downlink reference signal) transmitted from the base station 10. The received signal processing section 404 can be composed of a signal processor, a signal processing circuit or a signal processing apparatus described based on the common knowledge in the technical field according to the present invention. Furthermore, the received signal processing section 404 can compose the receiving section according to the present disclosure.

The received signal processing section 404 outputs information decoded by the reception processing to the control section 401. The received signal processing section 404 outputs, for example, broadcast information, system information, an RRC signaling and DCI to the control section 401. Furthermore, the received signal processing section 404 outputs the received signal and/or the signal after the reception processing to the measurement section 405.

The measurement section 405 performs measurement related to the received signal. The measurement section 405 can be composed of a measurement instrument, a measurement circuit or a measurement apparatus described based on the common knowledge in the technical field according to the present invention.

For example, the measurement section 405 may perform RRM measurement or CSI measurement based on the received signal. The measurement section 405 may measure received power (e.g., RSRP), received quality (e.g., RSRQ or an SINR), a signal strength (e.g., RSSI) or channel information (e.g., CSI). The measurement section 405 may output a measurement result to the control section 401.

Furthermore, the control section 401 controls repetitions of the uplink shared channel based on at least one of the quasi-co-location, the Transmission Configuration Indication (TCI) state, the Sounding reference signal Resource Indicator (SRI) and the spatial relation information associated with a given number of repetitions or redundancy versions of the uplink shared channel. For example, a given repetition index or a given redundancy version index may be associated with at least one of a given TCI index, an SRI index and a given spatial relation information index.

Furthermore, when performing configured grant-based transmission for transmitting the uplink shared channel without scheduling by downlink control information, the control section 401 may repeatedly transmit uplink shared channels by using a plurality of configured grant-based transmission configurations. Alternatively, when performing configured grant-based transmission, the control section 401 may repeatedly transmit uplink shared channels by using a plurality of uplink shared channels whose at least ones of quasi-co-locations, the TCI states, SRIs and pieces of spatial relation information are different.

Alternatively, when performing configured grant-based transmission, the control section 401 may repeatedly transmit uplink shared channels by using one configured grant-based transmission configuration to which at least one of the given quasi-co-location, TCI state, SRI and spatial relation information associated with each repetition has been configured.

Furthermore, the control section 401 may multiplex (piggyback or map) a plurality of pieces of channel state information associated with a plurality of these transmission and reception points in a plurality of these uplink shared channels.

Furthermore, the control section 401 may multiplex a plurality of these pieces of channel state information (e.g., CSI reporting group) in each of a plurality of these uplink shared channels.

Furthermore, the control section 401 may multiplex corresponding channel state information in each of a plurality of these uplink shared channels.

Furthermore, the control section 401 may rate-match each of a plurality of these uplink shared channels by using one rate-matching pattern.

Furthermore, the control section 401 may multiplex (map) data that is based on one transport block in each of a plurality of uplink shared channels.

(Hardware Configuration)

In addition, the block diagrams used to describe the above embodiment illustrate blocks in function units. These function blocks (components) are realized by an arbitrary combination of at least one of hardware and software. Furthermore, a method for realizing each function block is not limited in particular. That is, each function block may be realized by using one physically or logically coupled apparatus or may be realized by using a plurality of these apparatuses formed by connecting two or more physically or logically separate apparatuses directly or indirectly (by using, for example, wired connection or radio connection). Each function block may be realized by combining software with the above one apparatus or a plurality of above apparatuses.

In this regard, the functions include judging, determining, deciding, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as a transmitting unit or a transmitter. As described above, the method for realizing each function block is not limited in particular.

Figure 17:
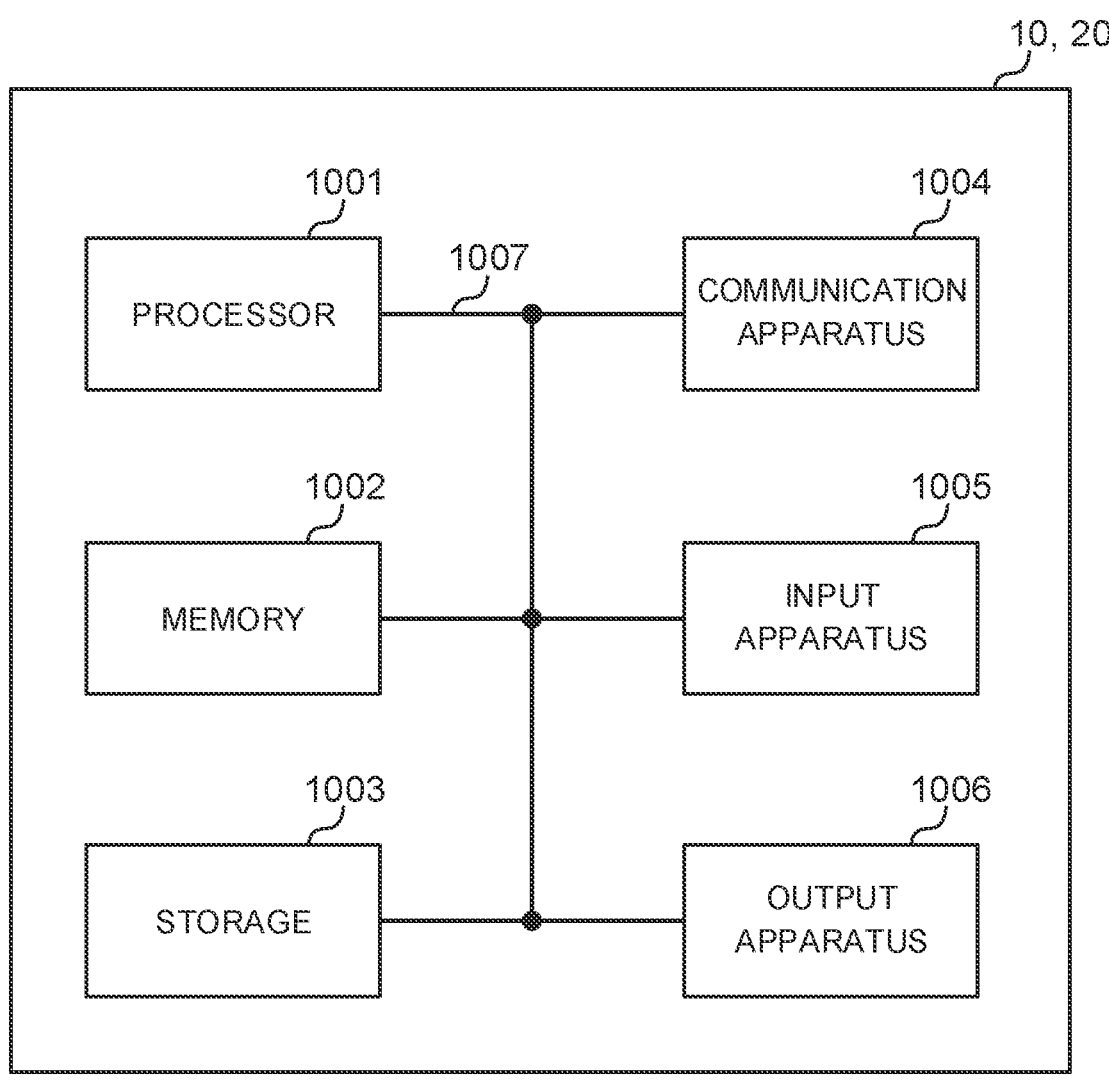
FIG. 17 is a diagram illustrating one example of hardware configurations of the base station and the user terminal according to the present embodiment.

For example, the base station and the user terminal according to the one embodiment of the present disclosure may function as computers that perform processing of the radio communication method according to the present disclosure. FIG. 17 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 17 or may be configured without including part of the apparatuses.

For example, FIG. 17 illustrates the only one processor 1001. However, there may be a plurality of processors. Furthermore, processing may be executed by one processor or processing may be executed by two or more processors concurrently or successively or by using another method. In addition, the processor 1001 may be implemented by one or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, the above-described baseband signal processing section 104 (204) and call processing section 105 may be realized by the processor 1001.

Furthermore, the processor 1001 reads programs (program codes), a software module or data from at least one of the storage 1003 and the communication apparatus 1004 out to the memory 1002, and executes various types of processing according to these programs, software module or data. As the programs, programs that cause the computer to execute at least part of the operations described in the above-described embodiment are used. For example, the control section 401 of the user terminal 20 may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmitting/receiving device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmission/reception antennas 101 (201), amplifying sections 102 (202), transmitting/receiving sections 103 (203) and communication path interface 106 may be realized by the communication apparatus 1004. Each transmitting/receiving section 103 (203) may be physically or logically separately implemented as a transmitting section 103a (203a) and a receiving section 103b (203b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS (Reference Signal), or may be referred to as a pilot or a pilot signal depending on standards to be applied. Furthermore, a Component Carrier (CC) may be referred to as a cell, a frequency carrier and a carrier frequency.

A radio frame may include one or a plurality of durations (frames) in a time domain Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on the numerologies.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier-Frequency Division Multiple Access (SC-FDMA) symbols) in the time domain. Furthermore, the slot may be a time unit based on the numerologies.

The slot may include a plurality of mini slots. Each mini slot may include one or a plurality of symbols in the time domain. Furthermore, the mini slot may be referred to as a subslot. The mini slot may include a smaller number of symbols than those of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a Transmission Time Interval (TTI), a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, one or more TTIs (i.e., one or more slots or one or more mini slots) may be a minimum time unit of scheduling.

Furthermore, the number of slots (the number of mini slots) that make up a minimum time unit of the scheduling may be controlled.

The TTI having the time duration of 1 ms may be referred to as a general TTI (TTIs according to LTE Rel. 8 to 12), a normal TTI, a long TTI, a general subframe, a normal subframe, a long subframe or a slot. A TTI shorter than the general TTI may be referred to as a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as a Physical Resource Block (PRB: Physical RB), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a BWP for UL (UL BWP) and a BWP for DL (DL BWP). One or a plurality of BWPs in 1 carrier may be configured to the UE.

At least one of the configured BWPs may be active, and the UE may not assume that a given signal/channel is transmitted and received outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the Physical Uplink Control Channel (PUCCH) and the Physical Downlink Control Channel (PDCCH)) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspects/embodiment described in the present disclosure and may be performed by using other methods. For example, the information may be notified by a physical layer signaling (e.g., Downlink Control Information (DCI) and Uplink Control Information (UCI)), a higher layer signaling (e.g., a Radio Resource Control (RRC) signaling, broadcast information (a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Decision may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used.

In the present disclosure, terms such as "precoding", a "precoder", a "weight (precoding weight)", "Quasi-Co-Location (QCL)", a "Transmission Configuration Indication state (TCI State)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as a transmission apparatus, a reception apparatus or a communication apparatus. In addition, at least one of the base station and the mobile station may be a device mounted on a mobile entity or the mobile entity itself. The mobile entity may be a vehicle (e.g., a car or an airplane), may be a mobile entity (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/ embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flow-chart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are expanded based on these systems. Furthermore, a plurality of systems may be combined (e.g., a combination of LTE or LTE-A and 5G) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be regarded to "decide (determine)" judging, calculating, computing, processing, deriving, investigating, looking up, search and inquiry (e.g., looking up in a table, a database or another data structure), and ascertaining.

Furthermore, "deciding (determining)" may be regarded to "decide (determine)" receiving (e.g., receiving information), transmitting (e.g., transmitting information), input, output and accessing (e.g., accessing data in a memory).

Furthermore, "deciding (determining)" may be regarded to "decide (determine)" resolving, selecting, choosing, establishing and comparing. That is, "deciding (determining)" may be regarded to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between two or more elements, and can include that one or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using one or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends not to be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiment described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
a receiver that receives information including multiple spatial relation information; and
a processor that controls transmission of a channel state information (CSI) report using first spatial relation information, the first spatial relation information corresponding to a first transmission and reception point among the multiple spatial relation information, on a first repetition of multiple repetitions of an uplink shared channel, and controls transmission of the CSI report using second spatial relation information, the second spatial relation information corresponding to a second transmission and reception point among the multiple spatial relation information, on a second repetition of the multiple repetitions of the uplink shared channel,
wherein at least one of the first spatial relation information and the second spatial relation information is associated with a sounding reference signal (SRS),
wherein the CSI report is one of a semi-persistent CSI report and an aperiodic CSI report,
wherein the processor controls transmission of the CSI report on all repetitions of the multiple repetitions of the uplink shared channel,
wherein a number of repetitions of the multiple repetitions of the uplink shared channel is two, and
wherein the processor controls transmission of multiple CSI reports on the first repetition, and controls transmission of the multiple CSI reports on the second repetition.

2. The terminal according to claim 1, wherein the processor controls transmission of the CSI report on part of repetitions of the multiple repetitions of the uplink shared channel.

3. The terminal according to claim 1, wherein a transport block is not transmitted on each repetition of the multiple repetitions of the uplink shared channel.

4. A radio communication method for a terminal, comprising:
receiving information including multiple spatial relation information; and
controlling transmission of a channel state information (CSI) report using first spatial relation information, the first spatial relation information corresponding to a first transmission and reception point among the multiple spatial relation information, on a first repetition of multiple repetitions of an uplink shared channel, and controlling transmission of the CSI report using second spatial relation information, the second spatial relation information corresponding to a second transmission and reception point among the multiple spatial relation information, on a second repetition of the multiple repetitions of the uplink shared channel,
wherein at least one of the first spatial relation information and the second spatial relation information is associated with a sounding reference signal (SRS),
wherein the CSI report is one of a semi-persistent CSI report and an aperiodic CSI report,
wherein the terminal controls transmission of the CSI report on all repetitions of the multiple repetitions of the uplink shared channel,
wherein a number of repetitions of the multiple repetitions of the uplink shared channel is two, and wherein the terminal controls transmission of multiple CSI reports on the first repetition, and controls transmission of the multiple CSI reports on the second repetition.

5. A base station comprising:

a transmitter that transmits, to a terminal, information including multiple spatial relation information; and a processor that controls reception of a channel state information (CSI) report, transmitted from the terminal, using first spatial relation information, the first spatial relation information corresponding to a first transmission and reception point among the multiple spatial relation information, on a first repetition of multiple repetitions of an uplink shared channel, and controls reception of the CSI report using second spatial relation information, the second spatial relation information corresponding to a second transmission and reception point among the multiple spatial relation information, on a second repetition of the multiple repetitions of the uplink shared channel, wherein at least one of the first spatial relation information and the second spatial relation information is associated with a sounding reference signal (SRS), wherein the CSI report is one of a semi-persistent CSI report and an aperiodic CSI report, wherein the terminal controls transmission of the CSI report on all repetitions of the multiple repetitions of the uplink shared channel, wherein a number of repetitions of the multiple repetitions of the uplink shared channel is two, and wherein the terminal controls transmission of multiple CSI reports on the first repetition, and controls transmission of the multiple CSI reports on the second repetition.

6. A system comprising a terminal and a base station, wherein the base station comprises:

a transmitter that transmits, to the terminal, information including multiple spatial relation information, and the terminal comprises:

a receiver that receives the information; and a processor that controls transmission of a channel state information (CSI) report using first spatial relation information, the first spatial relation information corresponding to a first transmission and reception point among the multiple spatial relation information, on a first repetition of multiple repetitions of an uplink shared channel, and controls transmission of the CSI report using second spatial relation information, the second spatial relation information corresponding to a second transmission and reception point among the multiple spatial relation information, on a second repetition of the multiple repetitions of the uplink shared channel, wherein at least one of the first spatial relation information and the second spatial relation information is associated with a sounding reference signal (SRS), wherein the CSI report is one of a semi-persistent CSI report and an aperiodic CSI report, wherein the processor controls transmission of the CSI report on all repetitions of the multiple repetitions of the uplink shared channel, wherein a number of repetitions of the multiple repetitions of the uplink shared channel is two, and wherein the processor controls transmission of multiple CSI reports on the first repetition, and controls transmission of the multiple CSI reports on the second repetition.

* * * * *